(12) United States Patent
Bailey

(10) Patent No.: US 12,018,779 B2
(45) Date of Patent: Jun. 25, 2024

(54) STABILIZING FACE RING JOINT FLANGE AND ASSEMBLY THEREOF

(71) Applicant: Abilene Christian University, Abilene, TX (US)

(72) Inventor: Thomas Bailey, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 0 days.

(21) Appl. No.: 17/933,558

(22) Filed: Sep. 20, 2022

(65) Prior Publication Data

US 2023/0088516 A1    Mar. 23, 2023

Related U.S. Application Data

(60) Provisional application No. 63/246,519, filed on Sep. 21, 2021.

(51) Int. Cl.
| | | |
|---|---|---|
| *F16L 23/18* | (2006.01) | |
| *F16L 23/02* | (2006.01) | |
| *F16L 23/024* | (2006.01) | |
| *F16L 23/032* | (2006.01) | |
| *G21C 1/22* | (2006.01) | |
| *G21C 3/54* | (2006.01) | |

(52) U.S. Cl.
CPC ............. *F16L 23/18* (2013.01); *F16L 23/032* (2013.01); *G21C 1/22* (2013.01); *G21C 3/54* (2013.01); *F16L 23/02* (2013.01); *F16L 23/024* (2013.01)

(58) Field of Classification Search
CPC ......... F16L 23/18; F16L 23/032; F16L 23/02; F16L 23/024; F16L 23/0283; F16L 23/20
See application file for complete search history.

(56) References Cited

U.S. PATENT DOCUMENTS

| | | | | |
|---|---|---|---|---|
| 1,873,855 | A | * 8/1932 | Wilson | ..................... F16L 23/20 |
| 2,291,709 | A | * 8/1942 | Goetze | ..................... F16L 23/20 |
| 2,669,465 | A | 2/1954 | Newell | |
| 3,166,345 | A | * 1/1965 | Pinkard | .................. F16L 23/20 |

(Continued)

FOREIGN PATENT DOCUMENTS

| | | |
|---|---|---|
| CN | 102878109 | 11/2014 |
| CN | 104214420 | 12/2014 |

(Continued)

OTHER PUBLICATIONS

Drilling Formulas, API Ring Gaskets Used in BOP Connections, pp. 1-5 (Year: 2014).*

(Continued)

*Primary Examiner* — William S. Choi
(74) *Attorney, Agent, or Firm* — King & Spalding

(57) ABSTRACT

In various embodiments, the stabilizing face ring joint flange and assemblies thereof can be adapted to include a ring joint gasket and resist leaks when a fluid flowing through a pipe at high temperatures and pressures. The stabilizing face ring joint flange assembly with the ring grooves in each flange can be situated in such a way that once full compression is achieved on the ring groove by the gasket, raised faces of the two flanges can meet to ensure that the rotation of the pump or any potential perpendicular loading do not provide a stress on the gasket that would cause the gasket to deform or cause a seal to be lost.

20 Claims, 16 Drawing Sheets

(56) References Cited

U.S. PATENT DOCUMENTS

| | | | |
|---|---|---|---|
| 3,387,867 A | * | 6/1968 | Rogers .............. F16L 23/0283 |
| 3,471,181 A | | 10/1969 | Fuentes |
| 3,972,547 A | | 8/1976 | Itoya |
| 4,384,730 A | * | 5/1983 | Diehl |
| 4,390,186 A | * | 6/1983 | McGee |
| 4,410,186 A | * | 10/1983 | Pierce, Jr. .............. F16L 23/20 |
| 4,539,846 A | | 9/1985 | Grossman |
| 4,550,921 A | * | 11/1985 | Smith .............. F16L 23/20 |
| 5,016,920 A | | 5/1991 | Anderson |
| 5,630,592 A | | 5/1997 | Obara et al. |
| 6,125,912 A | | 10/2000 | Branagan et al. |
| 6,186,159 B1 | | 2/2001 | DeGood |
| 7,160,367 B2 | | 1/2007 | Babicki |
| 7,400,697 B1 | | 7/2008 | Carmack et al. |
| 7,648,792 B2 | | 1/2010 | Kaschmitter |
| 7,707,987 B2 | | 5/2010 | Guthrie |
| 7,931,080 B2 | | 4/2011 | O'Brien |
| 7,980,304 B2 | | 7/2011 | O'Brien |
| 8,186,430 B2 | | 5/2012 | O'Brien |
| 8,238,509 B2 | | 8/2012 | Moen et al. |
| 8,636,892 B2 | | 1/2014 | Koehl et al. |
| 8,703,063 B2 | | 4/2014 | Hottovy |
| 8,746,440 B2 | | 6/2014 | Williamson et al. |
| 8,767,905 B2 | | 7/2014 | Neeley et al. |
| 8,771,482 B2 | | 7/2014 | Bailey et al. |
| 8,900,439 B2 | | 12/2014 | Wiedmeyer et al. |
| 8,956,524 B2 | | 2/2015 | Wiedmeyer et al. |
| 9,008,257 B2 | | 4/2015 | Hyde et al. |
| 9,017,527 B2 | | 4/2015 | Wiedmeyer et al. |
| 9,074,922 B2 | | 7/2015 | Dayal et al. |
| 9,150,975 B2 | | 10/2015 | Berger et al. |
| 9,208,909 B2 | | 12/2015 | Runkle et al. |
| 9,224,507 B2 | | 12/2015 | Heinold et al. |
| 9,251,920 B2 | | 2/2016 | Loewen et al. |
| 9,305,673 B2 | | 4/2016 | Heinold et al. |
| 9,324,465 B2 | | 4/2016 | Splichal, Jr. |
| 9,368,238 B2 | | 6/2016 | Theofanous et al. |
| 9,368,241 B2 | | 6/2016 | Loewen et al. |
| 9,376,639 B2 | | 6/2016 | Walter et al. |
| 9,460,818 B2 | | 10/2016 | Bergman |
| 9,475,706 B2 | | 10/2016 | Policke et al. |
| 9,522,462 B2 | | 12/2016 | Baker et al. |
| 9,691,507 B2 | | 6/2017 | Hyde et al. |
| 9,691,508 B2 | | 6/2017 | Hyde et al. |
| 9,728,288 B2 | | 8/2017 | Hyde et al. |
| 9,748,007 B2 | | 8/2017 | Hyde et al. |
| 9,761,336 B2 | | 9/2017 | Caine et al. |
| 9,761,337 B2 | | 9/2017 | Hyde et al. |
| 9,799,417 B2 | | 10/2017 | Hyde et al. |
| 9,875,817 B2 | | 1/2018 | Edwards et al. |
| 9,875,818 B2 | | 1/2018 | Mark et al. |
| 9,881,700 B2 | | 1/2018 | LeBlanc |
| 9,892,807 B2 | | 2/2018 | Hyde et al. |
| 9,894,802 B2 | | 2/2018 | Loewen et al. |
| 9,911,514 B2 | | 3/2018 | Edwards et al. |
| 9,921,158 B2 | | 3/2018 | Rider |
| 9,941,025 B2 | | 4/2018 | Ahlfeld et al. |
| 10,041,163 B1 | | 8/2018 | Offer et al. |
| 10,056,160 B2 | | 8/2018 | LeBlanc |
| 10,141,079 B2 | | 11/2018 | Czerwinski et al. |
| 10,144,874 B2 | | 12/2018 | Walter |
| 10,147,506 B2 | | 12/2018 | Malloy, III et al. |
| 10,176,901 B2 | | 1/2019 | Loewen |
| 10,197,200 B2 | | 2/2019 | Kolb et al. |
| 10,221,499 B2 | | 3/2019 | Miller et al. |
| 10,229,757 B2 | | 3/2019 | Filippone |
| 10,280,527 B2 | | 5/2019 | Loewen et al. |
| 10,290,381 B2 | | 5/2019 | Caine et al. |
| 10,311,981 B2 | | 6/2019 | Hackett et al. |
| 10,343,102 B2 | | 7/2019 | Reasoner |
| 10,438,705 B2 | | 10/2019 | Cheatham, III |
| 10,497,479 B2 | | 12/2019 | Abbott |
| 10,497,480 B2 | | 12/2019 | Cheatham, III et al. |
| 10,515,729 B2 | | 12/2019 | Horn et al. |
| 10,535,437 B2 | | 1/2020 | Hyde et al. |
| 10,566,096 B2 | | 2/2020 | Czerwinski |
| 10,573,416 B2 | | 2/2020 | Venneri |
| 10,636,532 B2 | | 4/2020 | Anderson et al. |
| 10,643,754 B2 | | 5/2020 | Venneri |
| 10,650,934 B2 | | 5/2020 | Caine et al. |
| 10,665,356 B2 | | 5/2020 | Abbott |
| 10,685,750 B2 | | 6/2020 | Eichel et al. |
| 10,734,122 B2 | | 8/2020 | Cisneros, Jr. |
| 10,738,367 B2 | | 8/2020 | Hackett |
| 10,741,293 B2 | | 8/2020 | Abbott |
| 10,746,330 B2 | * | 8/2020 | Hughes .............. F16L 23/18 |
| 10,755,822 B2 | | 8/2020 | Gibbons et al. |
| 10,760,004 B2 | | 9/2020 | Garcia-Perez et al. |
| 10,787,609 B2 | | 9/2020 | Garcia-Perez et al. |
| 10,787,610 B2 | | 9/2020 | Goodrich et al. |
| 10,825,571 B2 | | 11/2020 | Edwards et al. |
| 10,867,710 B2 | | 12/2020 | Cisneros, Jr. |
| 10,923,238 B2 | | 2/2021 | Abbott |
| 10,937,557 B2 | | 3/2021 | Sineath et al. |
| 10,962,461 B2 | | 3/2021 | Linneen |
| 11,028,303 B2 | | 6/2021 | Corbin et al. |
| 11,031,140 B2 | | 6/2021 | Hunt et al. |
| 11,043,309 B2 | | 6/2021 | Nygaard et al. |
| 11,049,624 B2 | | 6/2021 | Loewen et al. |
| 11,075,013 B2 | | 7/2021 | Abbott et al. |
| 11,075,015 B2 | | 7/2021 | Cisneros, Jr. |
| 11,133,114 B2 | | 9/2021 | Hackett et al. |
| 11,136,245 B2 | | 10/2021 | Benson |
| 11,145,424 B2 | | 10/2021 | Abbott |
| 11,149,623 B2 | | 10/2021 | Kutsch |
| 11,170,901 B2 | | 11/2021 | Cheatham, III |
| 11,200,991 B2 | | 12/2021 | LeBlanc |
| 11,205,523 B2 | | 12/2021 | Hyde et al. |
| 11,257,600 B2 | | 2/2022 | Anderson et al. |
| 11,264,141 B2 | | 3/2022 | Venneri |
| 11,276,503 B2 | | 3/2022 | Cisneros, Jr. et al. |
| 11,289,212 B2 | | 3/2022 | Inman et al. |
| 11,342,084 B2 | | 5/2022 | Cheatham, III et al. |
| 11,342,085 B2 | | 5/2022 | Hinds |
| 11,367,536 B2 | | 6/2022 | Abbott |
| 11,373,765 B2 | | 6/2022 | Czerwinski |
| 11,373,769 B2 | | 6/2022 | Hinds |
| 11,380,450 B2 | | 7/2022 | Sineath et al. |
| 11,417,435 B2 | | 8/2022 | Nelson |
| 11,417,437 B2 | | 8/2022 | Venneri |
| 11,424,041 B2 | | 8/2022 | Fisher et al. |
| 11,428,564 B2 | | 8/2022 | Dayal et al. |
| 11,434,429 B2 | | 9/2022 | Goodrich et al. |
| 11,437,156 B2 | | 9/2022 | Russell, II et al. |
| 11,443,859 B2 | | 9/2022 | Bass et al. |
| 11,482,345 B2 | | 10/2022 | Hunt et al. |
| 11,488,731 B2 | | 11/2022 | Abbott |
| 11,495,363 B2 | | 11/2022 | Gramlich et al. |
| 11,501,883 B2 | | 11/2022 | Eichel et al. |
| 11,542,437 B2 | | 1/2023 | Garcia-Perez et al. |
| 11,545,274 B2 | | 1/2023 | Bass et al. |
| 11,569,000 B2 | | 1/2023 | Hinds |
| 11,574,094 B2 | | 2/2023 | Pivovar et al. |
| 2006/0000007 A1 | | 1/2006 | Lin |
| 2007/0001933 A1 | | 1/2007 | Hoffmann |
| 2009/0046825 A1 | | 2/2009 | Dulka et al. |
| 2009/0115188 A1 | * | 5/2009 | Howard .............. F16L 23/032 |
| 2009/0173491 A1 | | 7/2009 | O'Brien |
| 2012/0012330 A1 | | 1/2012 | Botich |
| 2012/0082911 A1 | | 4/2012 | Hyde et al. |
| 2012/0082913 A1 | | 4/2012 | Hyde et al. |
| 2012/0087455 A1 | | 4/2012 | Hyde et al. |
| 2013/0083878 A1 | | 4/2013 | Massie et al. |
| 2014/0185733 A1 | | 7/2014 | Povirk et al. |
| 2015/0228363 A1 | | 8/2015 | Dewan et al. |
| 2015/0310948 A1 | | 10/2015 | Venneri |
| 2016/0189812 A1 | | 6/2016 | Czerwinski |
| 2016/0189813 A1 | | 6/2016 | Cisneros, Jr. |
| 2016/0217874 A1 | | 7/2016 | Dewan et al. |
| 2016/0272903 A1 | | 9/2016 | Walter et al. |
| 2017/0206984 A1 | | 7/2017 | Lee et al. |
| 2017/0271033 A1 | | 9/2017 | Dodson et al. |
| 2017/0292179 A1 | | 10/2017 | Hackett |
| 2017/0294240 A1 | | 10/2017 | Baglietto et al. |

(56) References Cited

U.S. PATENT DOCUMENTS

| | | |
|---|---|---|
| 2017/0294241 A1 | 10/2017 | Dodson et al. |
| 2017/0301413 A1 | 10/2017 | Cisneros, Jr. |
| 2017/0301418 A1 | 10/2017 | Dodson et al. |
| 2017/0316840 A1 | 11/2017 | Abbott |
| 2018/0030576 A1 | 2/2018 | Urza |
| 2018/0244535 A1 | 8/2018 | Russell, II et al. |
| 2018/0254109 A1 | 9/2018 | Cheatham, III et al. |
| 2018/0321192 A1* | 11/2018 | Gardner |
| 2018/0322968 A1 | 11/2018 | Cheatham, III et al. |
| 2019/0003622 A1* | 1/2019 | Karoliussen ............ F16L 23/20 |
| 2019/0035510 A1 | 1/2019 | LeBlanc |
| 2019/0057783 A1 | 2/2019 | LeBlanc |
| 2019/0066857 A1 | 2/2019 | Hackett et al. |
| 2019/0139665 A1 | 5/2019 | Czerwinski et al. |
| 2019/0203614 A1 | 7/2019 | Loewen et al. |
| 2019/0371482 A1 | 12/2019 | Benson |
| 2020/0027581 A1 | 1/2020 | Hackett et al. |
| 2020/0087156 A1 | 3/2020 | Kelleher |
| 2020/0122109 A1 | 4/2020 | Kruizenga et al. |
| 2020/0161015 A1 | 5/2020 | Czerwinski et al. |
| 2020/0373024 A1 | 11/2020 | Gramlich |
| 2020/0393123 A1 | 12/2020 | Aly |
| 2021/0047199 A1 | 2/2021 | Russell, II et al. |
| 2021/0047568 A1 | 2/2021 | Goodrich et al. |
| 2021/0095645 A1 | 4/2021 | Cheatham, III |
| 2021/0130181 A1 | 5/2021 | Brown et al. |
| 2021/0170676 A1 | 6/2021 | Kitchen et al. |
| 2021/0210224 A1 | 7/2021 | Cisneros, Jr. |
| 2021/0272707 A1 | 9/2021 | Wardle |
| 2021/0272708 A1 | 9/2021 | Cisneros, Jr. |
| 2021/0287814 A1 | 9/2021 | Loewen et al. |
| 2021/0302295 A1 | 9/2021 | Linneen |
| 2021/0304909 A1 | 9/2021 | Gramlich et al. |
| 2021/0313081 A1 | 10/2021 | Nygaard et al. |
| 2021/0318673 A1 | 10/2021 | Kitchen et al. |
| 2021/0319920 A1 | 10/2021 | Gramlich et al. |
| 2021/0343431 A1 | 11/2021 | Cisneros, Jr. |
| 2022/0005619 A1 | 1/2022 | Cisneros, Jr. |
| 2022/0017382 A1 | 1/2022 | Russell, II et al. |
| 2022/0051814 A1 | 2/2022 | Freeman et al. |
| 2022/0051816 A1 | 2/2022 | Freeman |
| 2022/0051817 A1 | 2/2022 | Hejzlar et al. |
| 2022/0051818 A1 | 2/2022 | Cisneros, Jr. |
| 2022/0051820 A1 | 2/2022 | Corbin |
| 2022/0068512 A1 | 3/2022 | Russell, II et al. |
| 2022/0081317 A1 | 3/2022 | Russell, II et al. |
| 2022/0115149 A1 | 4/2022 | Barringer et al. |
| 2022/0115150 A1 | 4/2022 | Hackett et al. |
| 2022/0115152 A1 | 4/2022 | Barringer et al. |
| 2022/0139576 A1 | 5/2022 | Inman et al. |
| 2022/0139577 A1 | 5/2022 | Cisneros, Jr. et al. |
| 2022/0139578 A1 | 5/2022 | Venneri et al. |
| 2022/0250936 A1 | 8/2022 | Benson |
| 2022/0254524 A1 | 8/2022 | Cheatham, III et al. |
| 2022/0301729 A1 | 9/2022 | Cisneros, Jr. |
| 2022/0301732 A1 | 9/2022 | Cisneros, Jr. et al. |
| 2022/0310278 A1 | 9/2022 | Choi et al. |
| 2022/0310281 A1 | 9/2022 | Czerwinski |
| 2022/0324066 A1 | 10/2022 | Argentine |
| 2022/0328202 A1 | 10/2022 | Venneri et al. |
| 2022/0328203 A1 | 10/2022 | Bass et al. |
| 2022/0328205 A1 | 10/2022 | Bass et al. |
| 2022/0336118 A1 | 10/2022 | Corbin et al. |
| 2022/0351870 A1 | 11/2022 | Fisher et al. |
| 2022/0363995 A1 | 11/2022 | Goodrich et al. |
| 2022/0375635 A9 | 11/2022 | LeBlanc |
| 2023/0024338 A1 | 1/2023 | Reed et al. |
| 2023/0096162 A1 | 3/2023 | Loewen et al. |
| 2023/0104365 A1 | 4/2023 | Eichel et al. |

FOREIGN PATENT DOCUMENTS

| | | |
|---|---|---|
| CN | 102937090 | 4/2015 |
| CN | 104862531 | 8/2015 |
| CN | 105060914 | 11/2015 |
| CN | 106425315 | 2/2017 |
| CN | 105334138 | 1/2018 |
| CN | 106180254 | 6/2018 |
| CN | 108151567 | 6/2018 |
| CN | 108172318 | 6/2018 |
| CN | 108389634 | 8/2018 |
| CN | 108511088 | 9/2018 |
| CN | 108520785 | 9/2018 |
| CN | 207850147 | 9/2018 |
| CN | 108624839 | 10/2018 |
| CN | 107034386 | 11/2018 |
| CN | 107130242 | 3/2019 |
| CN | 109509562 | 3/2019 |
| CN | 106840765 | 4/2019 |
| CN | 109671510 | 4/2019 |
| CN | 105976879 | 5/2019 |
| CN | 108198635 | 7/2019 |
| CN | 110042434 | 7/2019 |
| CN | 108206065 | 9/2019 |
| CN | 109022921 | 9/2019 |
| CN | 107469628 | 10/2019 |
| CN | 107945887 | 10/2019 |
| CN | 108389632 | 10/2019 |
| CN | 109234573 | 10/2019 |
| CN | 209496626 | 10/2019 |
| CN | 110783010 | 2/2020 |
| CN | 110842494 | 2/2020 |
| CN | 210039648 | 2/2020 |
| CN | 107238627 | 3/2020 |
| CN | 108167195 | 7/2020 |
| CN | 111508627 | 8/2020 |
| CN | 211742680 | 10/2020 |
| CN | 112111251 | 12/2020 |
| CN | 112284170 | 1/2021 |
| CN | 112322939 | 2/2021 |
| CN | 110549697 | 4/2021 |
| CN | 112609195 | 4/2021 |
| CN | 212934166 | 4/2021 |
| CN | 110444311 | 5/2021 |
| CN | 112778012 | 5/2021 |
| CN | 108417277 | 6/2021 |
| CN | 110695091 | 6/2021 |
| CN | 113202780 | 8/2021 |
| CN | 113369652 | 9/2021 |
| CN | 214529256 | 10/2021 |
| CN | 113630582 | 11/2021 |
| CN | 113658722 | 11/2021 |
| CN | 111334258 | 12/2021 |
| CN | 111421913 | 12/2021 |
| CN | 113744900 | 12/2021 |
| CN | 113851233 | 12/2021 |
| CN | 214998262 | 12/2021 |
| CN | 113936820 | 1/2022 |
| CN | 113990535 | 1/2022 |
| CN | 111627571 | 2/2022 |
| CN | 113061781 | 2/2022 |
| CN | 114074234 | 2/2022 |
| CN | 114093529 | 2/2022 |
| CN | 215770541 | 2/2022 |
| CN | 111057993 | 3/2022 |
| CN | 114774738 | 7/2022 |
| CN | 112228853 | 8/2022 |
| CN | 112259263 | 8/2022 |
| CN | 112530614 | 8/2022 |
| CN | 114917603 | 8/2022 |
| CN | 114927242 | 8/2022 |
| CN | 111627572 | 9/2022 |
| CN | 111945171 | 9/2022 |
| CN | 112174670 | 9/2022 |
| CN | 115050490 | 9/2022 |
| CN | 115076479 | 9/2022 |
| CN | 111739665 | 10/2022 |
| CN | 112992389 | 11/2022 |
| CN | 115351276 | 11/2022 |
| CN | 112587989 | 12/2022 |
| CN | 113241200 | 12/2022 |
| CN | 115436402 | 12/2022 |
| EP | 3563389 | 7/2021 |
| WO | WO 2013077941 | 10/2013 |

(56) References Cited

FOREIGN PATENT DOCUMENTS

| | | |
|---|---|---|
| WO | WO 2014039641 | 6/2014 |
| WO | WO 2015017928 | 2/2015 |
| WO | WO 2015094450 | 10/2015 |
| WO | WO 2017032379 | 3/2017 |
| WO | WO 2017059360 | 4/2017 |
| WO | WO 2017192607 | 11/2017 |
| WO | WO 2018009433 | 1/2018 |
| WO | WO 2018013317 | 1/2018 |
| WO | WO 20180311 | 2/2018 |
| WO | WO 2017199059 | 2/2018 |
| WO | WO 2018026429 | 3/2018 |
| WO | WO 2018042216 | 4/2018 |
| WO | WO 2018064572 | 4/2018 |
| WO | WO 2018071081 | 5/2018 |
| WO | WO 2018084940 | 6/2018 |
| WO | WO 2018213669 | 1/2019 |
| WO | WO 2019152595 | 8/2019 |
| WO | WO 2019226218 | 1/2020 |
| WO | WO 2019231971 | 1/2020 |
| WO | WO 2020123513 | 8/2020 |
| WO | WO 2021151055 | 7/2021 |
| WO | WO 2021133952 | 9/2021 |
| WO | WO 2022022792 | 2/2022 |
| WO | WO 2022039795 | 2/2022 |
| WO | WO 2022039893 | 2/2022 |
| WO | WO 2022040116 | 3/2022 |
| WO | WO 2022061195 | 4/2022 |
| WO | WO 2022146446 | 7/2022 |

OTHER PUBLICATIONS

Types of Flanges. [online]. Wermac. Retrieved from the Internet: <URL:https://web.archive.org/web/20201111190327/https://www.wermac.org/flanges/flanges_welding-neck_socket-weld_lap-joint_screwed_blind.html > (Year: 2020).*

Blain R. Lancaster, High Resolution Distributed Temperature Measurements Using Optical Fibers in a Molten Salt Forced Convection Environment, Texas A&M University, pp. 1-53 (Year: 2021).*

* cited by examiner

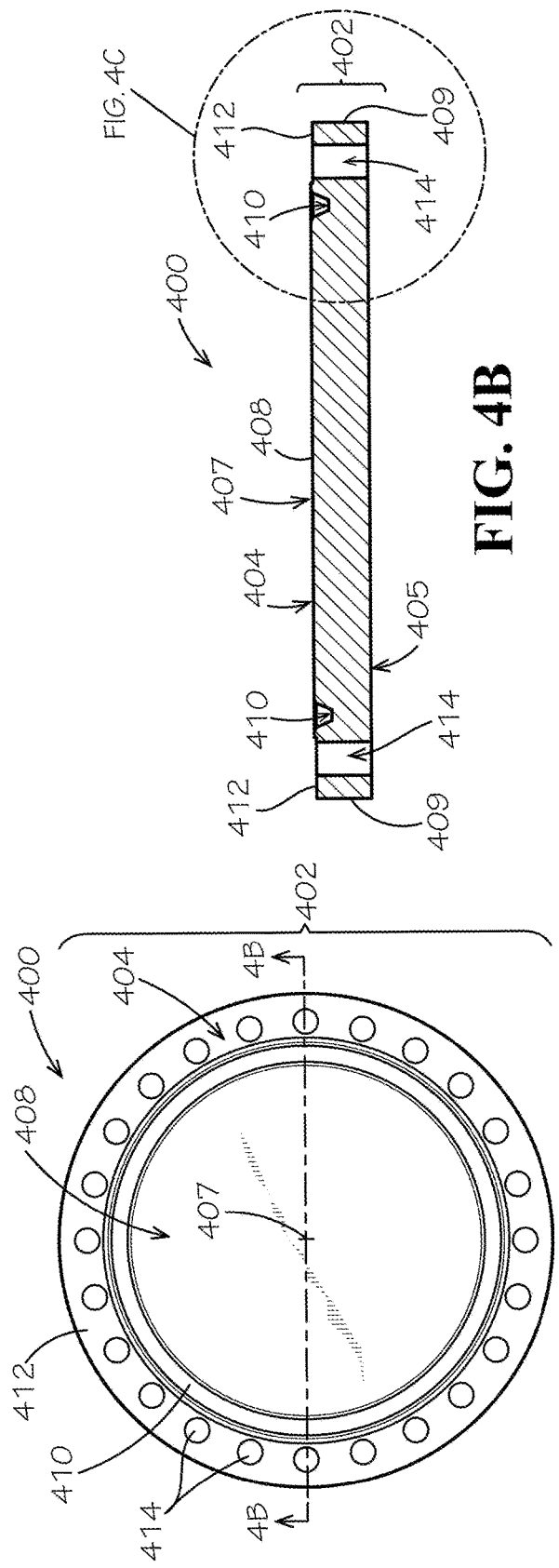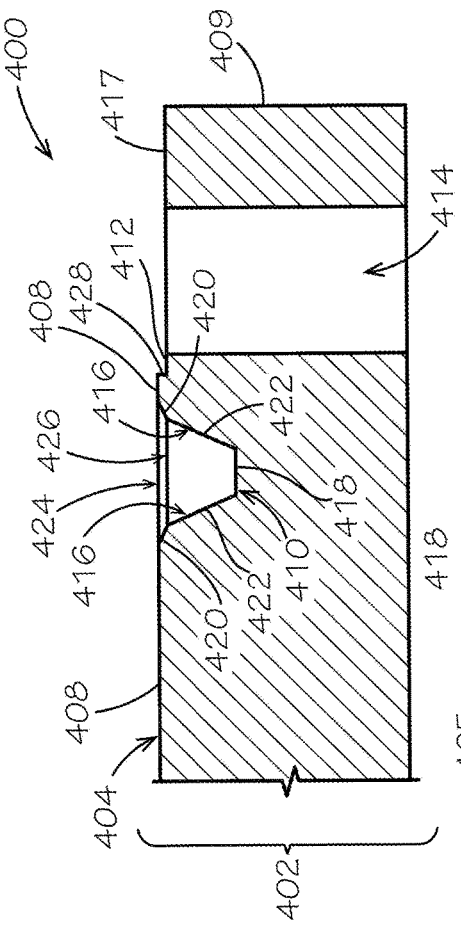

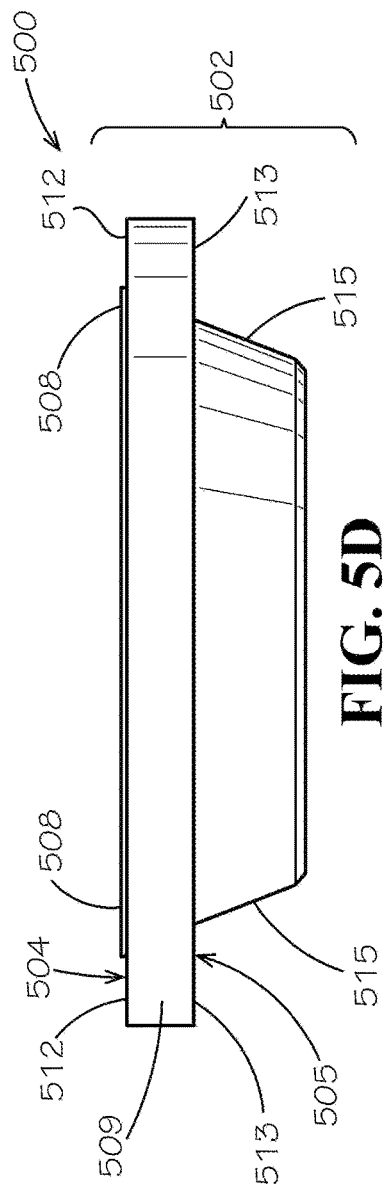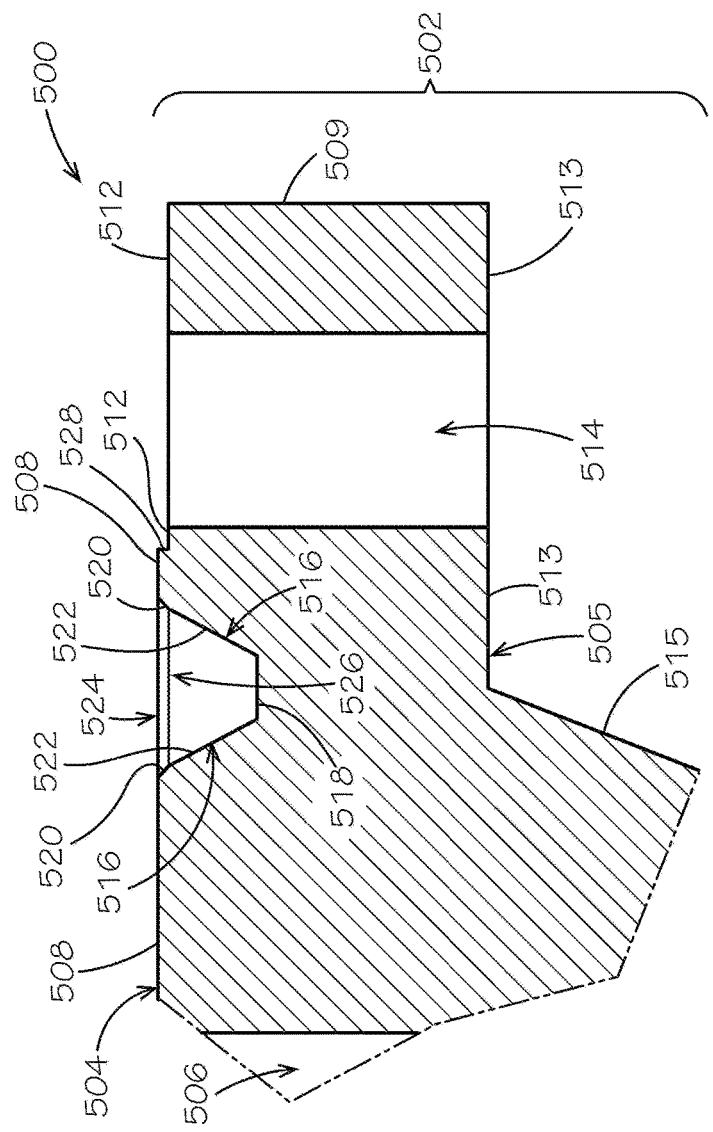

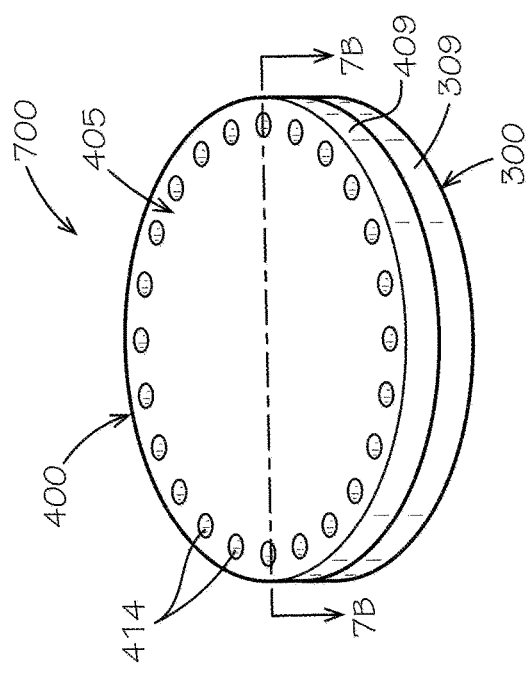
FIG. 7A
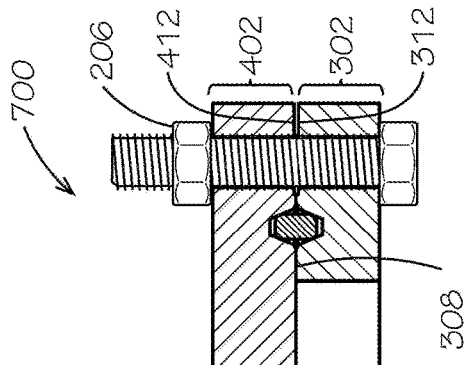
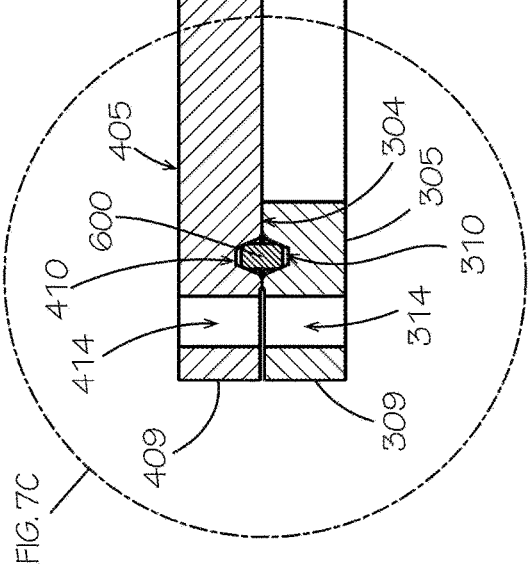
FIG. 7B

STABILIZING FACE RING JOINT FLANGE AND ASSEMBLY THEREOF

CROSS-REFERENCE TO RELATED APPLICATIONS

The present application claims priority under 35 U.S.C. § 119 to U.S. Provisional Application No. 63/246,519, entitled "STABILIZING FACE RING JOINT FLANGE", filed on Sep. 21, 2021, the entirety of which is incorporated by reference herein.

TECHNICAL FIELD

The described examples relate generally to flange structures, systems, and methods, such as those used in high temperature environments.

BACKGROUND

A flange or a clamp may be used to establish a connection between two components in a fluid system, such as by connecting a pipe to another pipe or to another component including a pump. In some cases, two flanges may be used to establish such fluid connection with a third component placed between the two flanges in order to mitigate fluids or/or gas leakage from the connection. The presence of the third component between each flange may establish a gap between each flange. In many conventional applications, flanges are torqued such that the third component, which can typically be made of a softer material than the flanges, is compressed. However, the gap remains between a face of each respective flange. The gap substantially hinders the operation of the flanges in many applications, particularly where the pipe connection is subject to a bending moment. For example, the third component may be compressed in a nonuniform manner due to such bending moment, which may result in cracking, leaks and other failure mechanisms.

Additionally, the foregoing hinderances of conventional flanges may be exacerbated in harsh environments, such as where temperatures can repeatedly cycle from ambient temperature to 700 degrees Celsius. As a consequence, conventional flanges may be inappropriate for use in molten salt reactor systems, and in environments near dynamic components (e.g., pumps) that can transfer vibrational forces, rotational forces, and vertical forces to the conventional flange, causing it to bend and lose the seal. Thus, there is a need for improved flanges and flange assemblies that can operate in such harsh environment, and that can withstand a bending moment and maintain the seal at the pipe connection.

SUMMARY

In one example, a stabilizing flange assembly is disclosed. The flange assembly includes a first flange formed from a flange body having a first side and a second side opposite the first side. The flange body defines a fluid opening extending between the first side and the second side. The flange body further defines a flange mating surface extending circumferentially about the fluid opening. The flange body further defines a ring groove formed in the flange body at the first mating surface and extending circumferentially about, and radially offset from, the fluid opening. The flange body further defines a flange peripheral surface extending circumferentially about, and elevationally offset from, the flange mating surface. The flange body further defines a plurality of fastener openings circumferentially spaced about the fluid opening and extending through the flange body at the flange peripheral surface. The flange assembly further includes a gasket seated in the ring groove of the flange. The flange assembly further includes a second flange arranged contacting the gasket and the mating surface of the first flange adjacent each side of the gasket. The flange assembly further includes a plurality of fasteners coupling the first and second flange and compressing the first and second flange toward one another. The gasket and the mating surface of the first flange cooperate to define a fluid tight connection between the fluid opening and the second flange.

In another example, the second flange may include a blind flange. The blind flange may be formed from a blind flange body. The blind flange body may define a blind flange mating surface extending circumferentially about a center of the blind flange body. The blind flange body may further define a blind flange ring groove formed in the blind flange body at the blind flange mating surface and extending circumferentially about, and radially offset from, the center of the blind flange body. The blind flange body may further define a blind flange peripheral surface extending circumferentially about, and elevationally offset from, the blind flange mating surface. The gasket may be seated in the blind flange ring groove with the mating surface of the first flange and the blind flange mating surface contacting one another.

In another example, the mating surface of the first flange and the blind flange mating surface contact one another adjacent both an inner surface of the gasket and an outer surface of the gasket. In some cases, the blind flange peripheral surface and the peripheral surface of the first flange establish a gap therebetween. The gasket and the mating surface of the first flange may cooperate to define the fluid tight connection between the fluid opening and the second flange while maintain the gap. Further, the blind flange ring groove and the ring groove of the first flange may define opposing trapezoidal region encompassing the gasket.

In another example, the ring groove for the first flange may include a base surface arranged parallel to, and elevationally offset from, the flange mating surface. The ring groove may further include a pair of symmetrically tapered groove surfaces extending angularly relative to the flange mating surface and the base surface.

In another example, the gasket may include a ring gasket having a generally rectangular cross-section. The gasket may further be seated in the ring groove contacting each symmetrically tapered groove surface of the pair of symmetrically tapered groove surfaces.

In another example, the gasket and the mating surface of the first flange may cooperate to define a fluid tight connection between the fluid opening of the first flange and the second flange with the gasket remaining offset from the base surface.

In another example, the second flange may include another first flange such that first and second flanges define a pair of flanges with the second flange include some or all of the features of first flange described herein.

In another example, the gasket includes a ring joint gasket.

In another example, the gasket and the mating surface of the first flange cooperate to define the fluid tight connection between the fluid opening and the second flange with a fluid in the fluid opening having a temperature exceeding 700° C.

In another example, a stabilizing flange is disclosed. The stabilizing flange includes a flange body having a first side and a second side opposite the first side. The flange body defines a fluid opening extending between the first side and the second side. The flange body further defines a flange mating surface extending circumferentially about the fluid opening. The flange body further defines a ring groove formed in the flange body at the first mating surface and extending circumferentially about, and radially offset from, the fluid opening. The flange mating surface is elevationally level along each of an inner portion of the ring groove and an outer portion of the ring groove. The flange body further defines a flange peripheral surface extending circumferentially about, and elevationally offset from, the flange mating surface. The flange body further defines a plurality of fastener openings circumferentially spaced about the fluid opening and extending through the flange body at the flange peripheral surface. The ring groove is configured to receive a gasket such that the gasket and the mating surface along each of the inner portion and the outer portion of the ring groove form a physical connection with a raised face of another flange and establish a fluid tight connection therebetween.

In another example, the ring groove may be configured to receive the gasket in a manner that uniformly distributes a compressive load on the gasket that forms the fluid tight connection.

In another example, the ring groove includes a first side wall extending angularly relative to the mating surface. The ring groove further includes a second side wall extending angularly relative to the mating surface and toward the first side wall. The ring groove further includes a bottom wall joining the first and second sidewalls and arranged parallel to the mating surface.

In another example, the flange body may include a material of stainless steel, hastelloy, monel, inconel, titanium, duplex steel, nickel alloy, super duplex steel, incoloy, alloy 20, 254 SMO, copper nickel, carbon steel, alloy steel, aluminum, bronze, mild steel, or brass.

In another example, the flange body defines a weld neck flange, a socket weld flange, a lap joint flange, a blind flange, or a slip on flange.

In another example, a method of connecting a flange assembly is disclosed. The method includes providing a stabilizing flange, such as any of the stabilizing flanges disclosed herein. The method further includes seating a gasket in the ring groove. The method further includes connecting the stabilizing flange to a raised face of another flange by forming a physical connection between: (i) the gasket and a complementary ring groove of the another flange, and (ii) the mating surface adjacent each of the inner portion and the outer portion of the ring groove and the raised face.

In another example, the method may further include maintaining a fluid tight connection between the fluid opening and the another flange while containing a fluid in the fluid opening having a temperature in excess of 700° C.

In another example, the connection may further include associating the stabilizing flange with a sump tank of a molten salt loop such that the stabilizing flange is arranged to carry a molten salt generally vertically through the fluid opening.

In addition to the example aspects described above, further aspects and examples will become apparent by reference to the drawings and by study of the following description.

Exemplary embodiments of the stabilizing face ring joint flanges will now be described. The stabilizing face ring joint flanges may, however, be embodied in many different forms and should not be construed as limited to the exemplary embodiments set forth herein. Rather, the exemplary embodiments are provided so that this disclosure will be thorough and complete, and will fully convey the scope of the raised face flanges to those people having ordinary skill in the art.

The disclosed stabilizing face ring joint flanges are suitable for use in high temperature applications, high pressure systems, and a combination of high temperature and high pressure applications, such as where a pump passes vertically through a top flange of a sump tank in a high temperature system. Conventional flanges may not be suitable in an environment where temperatures can repeatedly cycle from ambient temperature to 700 degrees Celsius. A ring type joint flange can be preferable. However, ring type joint flanges can be problematic in this environment due to vibration, rotational forces, and the vertical load of the pump on the top flange. The disclosed stabilizing face ring joint flange can provide the high temp sealing capabilities of a ring type joint flange while also providing the necessary stability to maintain the ring gasket seal, among other things.

Exemplary embodiments of the stabilizing face ring joint flanges can have an outside diameter (OD), bolt hole diameter, number of bolt holes, diameter of bolt holes, and bolt circle of an ANSI/ASME flange. The outside diameter, bolt hole diameter, number of bolt holes, diameter of bolt holes, and bolt circle can, in some examples, conform to those of the ANSI/ASME B16.5 Class 300 flange.

An end of the stabilizing face ring joint flange can include a raised face that defines a ring groove adapted to receive a BX series American Petroleum Institute (API) ring joint gasket, such as an API 6A BX 163 gasket, or any other suitable ring joint gasket. In some examples, any type of ring joint and ring joint gasket can be used. An associated raised face can be machined or otherwise adapted to be a height such that the raised faces of the flange meet when the gasket is fully compressed. The stabilizing face ring joint flange can be adapted for any gasket, and can have a raised face that is dimensioned to mate together once the gasket is fully compressed.

The stabilizing face ring joint flange can be adapted to include a ring joint gasket and resist leaks when a fluid flowing through a pipe exceeds about 700° C. Associated mating faces of the flange can prevent deformation of the ring joint gasket in an instance in which any lateral or rotational load takes place. In some examples, the stabilizing face ring joint flange can be made of a material selected from the group consisting of: stainless steel, hastelloy, monel, inconel, titanium, duplex steel, nickel alloy, super duplex steel, incoloy, alloy 20, 254 SMO, copper nickel, carbon steel, alloy steel, aluminum, bronze, mild steel, and brass. The stabilizing face ring joint flange can be a weld neck, socket weld, lap joint, blind, or slip on. In at least one embodiment, a weld neck stabilizing face ring joint flange may reduce the potential for warping of the raised neck flange during the coupling process.

The stabilizing face ring joint flange with the ring groove can be situated in such a way that once full compression is achieved on the ring groove raised faces of two flanges can meet to ensure that the rotation of the pump or any potential perpendicular loading do not provide a stress on the gasket that would cause the gasket to deform or cause a seal to be lost. In some examples, the disclosed stabilizing face ring joint flange can be configured with any variation of ring type gasket that can reach full compression and that can allow raised faces of the flange(s) to meet. The disclosed stabilizing face ring joint flange can ensure that the gasket does not experience any unequal compression due to perpendicular loading or rotational forces induced by a pump.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4A illustrates a front view of an exemplary blind stabilizing face ring joint flange, according to one embodiment of the present disclosure;

FIG. 4B illustrates a cross-sectional view of the exemplary blind stabilizing face ring joint flange of FIG. 4A, taken along line 4B-4B of FIG. 4A, according to one embodiment of the present disclosure;

FIG. 4C illustrates detail 4C-4C of the exemplary blind stabilizing face ring joint flange of FIG. 4A, taken from FIG. 4B, according to one embodiment of the present disclosure;

FIG. 5D illustrates a side view of the exemplary weld neck stabilizing face ring joint flange of FIG. 5A, according to one embodiment of the present disclosure;

FIG. 5E illustrates detail 5E-5E of the exemplary weld neck stabilizing face ring joint flange of FIG. 5A, taken from FIG. 5C, according to one embodiment of the present disclosure;

FIG. 7A illustrates a perspective view of an exemplary blind flange assembly, according to one embodiment of the present disclosure;

FIG. 7B illustrates a cross-sectional view of the exemplary blind flange assembly of FIG. 7A, taken along line 7B-7B of FIG. 7A, according to one embodiment of the present disclosure;

Figure 1:
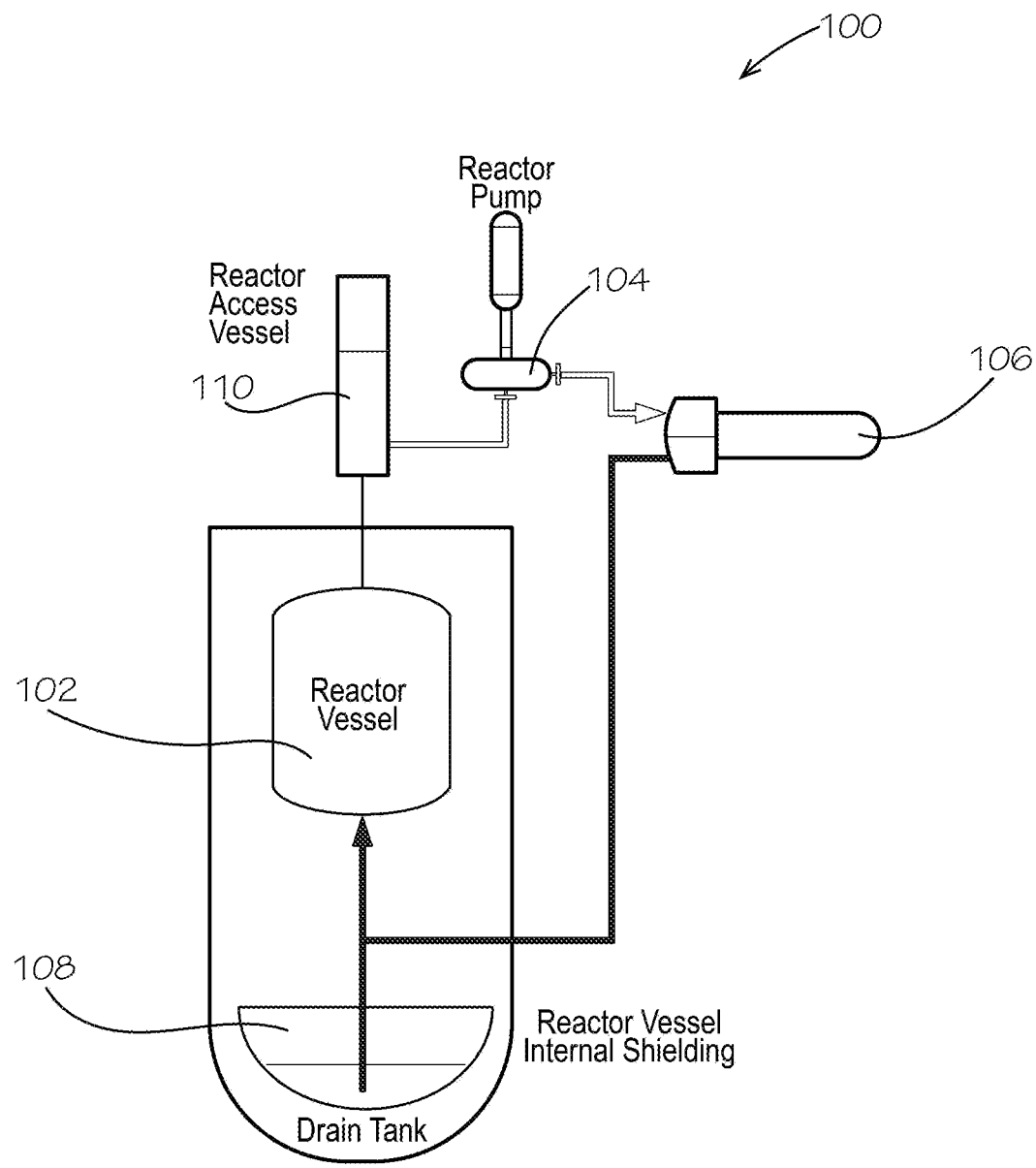
FIG. 1 illustrates a molten salt reactor system, according to one embodiment of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

The following disclosure relates generally to stabilizing face ring joint flanges for use in high temperature environments, such as in molten salt reactors. In various embodiments, the stabilizing face ring joint flange and assemblies thereof can be adapted to include a ring joint gasket and resist leaks when a fluid flowing through a pipe exceeds about 700° C. In one or more embodiments, associated mating faces of the flange can prevent deformation of the ring joint gasket in an instance in which any lateral or rotational load takes place. In some examples, the stabilizing face ring joint flange can be made of a material selected from the group consisting of: stainless steel, hastelloy, monel, inconel, titanium, duplex steel, nickel alloy, super duplex steel, incoloy, alloy 20, 254 SMO, copper nickel, carbon steel, alloy steel, aluminum, bronze, mild steel, and brass. In at least one embodiment, the stabilizing face ring joint flange can be a weld neck, socket weld, lap joint, blind, or slip on. In certain embodiments a weld neck stabilizing face ring joint flange may reduce the potential for warping of the raised neck flange during the coupling process.

The stabilizing face ring joint flange with the ring groove can be situated in such a way that, once full compression is achieved on the ring groove, the raised faces of the two flanges can meet and contact one another. This contact can establish a physical connection that ensures that the rotation of the pump or any potential perpendicular loading do not provide undue stress on the gasket, which would otherwise cause the gasket to deform or cause a seal to fail. In some examples, the disclosed stabilizing face ring joint flange can be configured with any variation of ring type gasket that can reach full compression and that can allow raised faces of the flange(s) to meet and contact one another to establish a physical connection therebetween. The disclosed stabilizing face ring joint flange can ensure that the gasket does not experience any unequal compression due to perpendicular loading or rotational forces induced by a pump.

Referring now to the figures, for the purposes of example and explanation of the fundamental processes and components of the disclosed systems and methods, reference is made to FIG. 1, which illustrates an exemplary, schematic overview of one embodiment of a molten salt reactor system 100. The molten salt reactor system may implement and include a stabilizing face ring joint flange and assemblies thereof, as described in greater detail below. As will be understood and appreciated, the exemplary, schematic overview shown in FIG. 1 represents merely one high temperature environment in which the stabilizing face ring joint flange and assemblies thereof may be utilized. It will be understood that the stabilizing face ring joint flange and assemblies described herein may be used in and with substantially any other harsh environment or operating system, such as those associated with high temperatures, high pressures, and/or high bending moments, among other characteristics, substantially analogous to those associated the molten salt reactor system 100 described herein.

In various embodiments, a molten salt reactor system 100 utilizes fuel salt enriched with uranium (e.g., high-assay low-enriched uranium) to create thermal power via nuclear fission reactions. In at least one embodiment, the composition of the fuel salt may be LiF-BeF2-UF4, though other compositions of fuel salts may be utilized as fuel salts within the reactor system 100. The fuel salt within the system 100 is heated to high temperatures (about 700° C.) and melts as the system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106, such that the molten fuel salt re-enters the reactor vessel after flowing through the heat exchanger, and piping in between each component. The molten salt reactor system 100 may also include additional components, such as, but not limited to, drain tank 108 and reactor access vessel 110). The drain tank 108 may be configured to store the fuel salt once the fuel salt is in the reactor system 100 but in a subcritical state, and also acts as storage for the fuel salt if power is lost in the system 100. The reactor access vessel may be configured to allow for introduction of small pellets of uranium fluoride (UF4) to the system 100 as necessary to bring the reactor to a critical state and compensate for depletion of fissile material.

In several embodiments, the stabilizing face ring joint flange disclosed herein may be utilized as a pipe connection throughout the molten salt reactor system 100. For example, in one embodiment, the disclosed flange and assemblies thereof may be utilized to connect piping to a pump outlet or may be utilized in connecting long lengths of piping. In many embodiments, for systems such as the molten salt reactor system (and also including other high temperature and high pressure systems and environments), the stabilizing face ring joint flange assembly can be adapted for any gasket and can have a raised face that is dimensioned to mate together once the gasket is fully compressed, to ensure that any bending moments that occur to the piping or at the flange assembly does not deform the gasket or break the seal between the two flanges of the flange assembly. Therefore, the flange and assemblies of the present disclosure may allow the system 100 may operate at such high temperatures and high pressures by mitigating the risk of seal failure throughout the pipe connections of the system 100.

Figure 2:
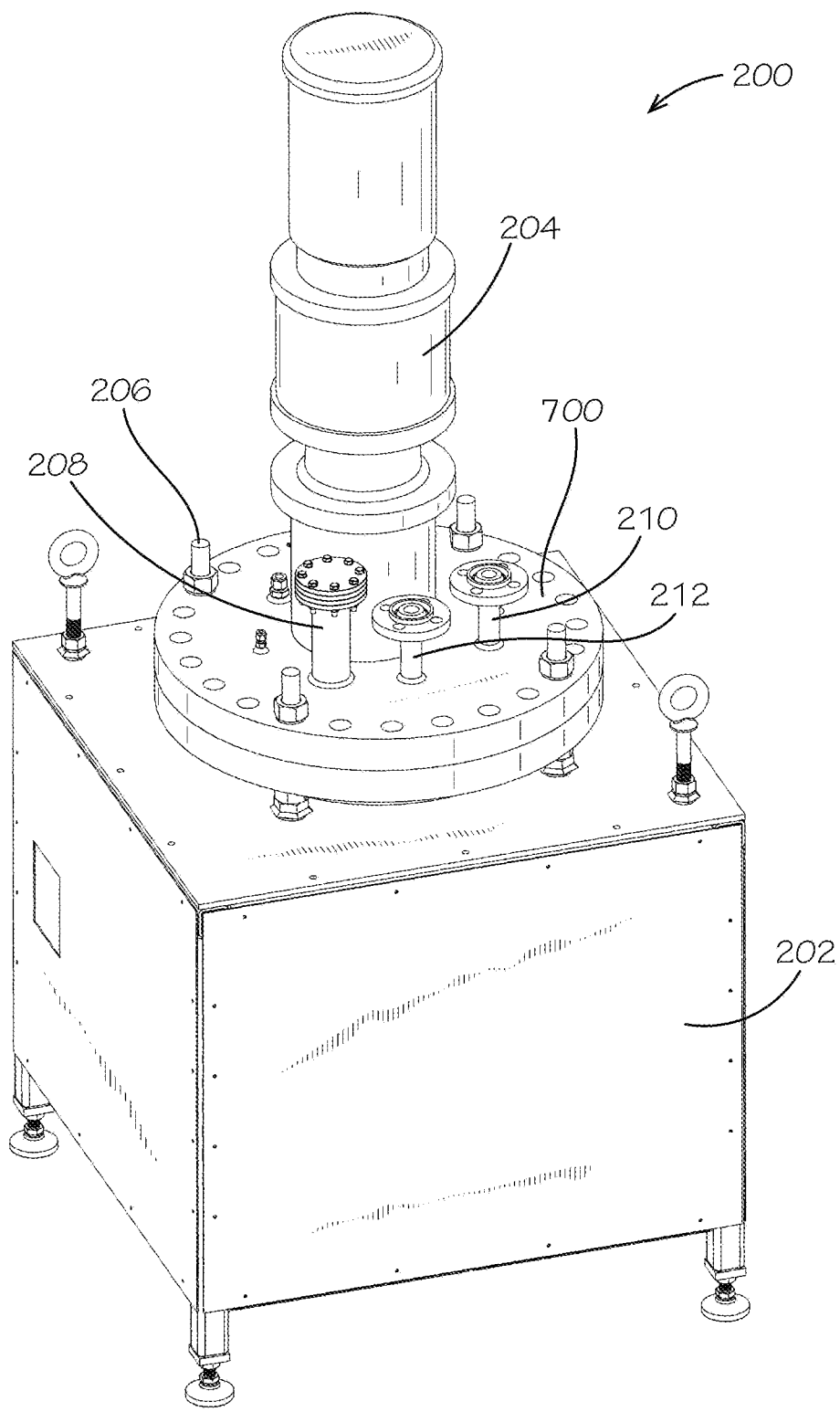
FIG. 2 illustrates a perspective view of a sump system with an exemplary flange assembly, according to one embodiment of the present disclosure.

Turning now to FIG. 2, a perspective view of a sump system 200, according to one embodiment of the present disclosure. The sump system 200 may be a system or subsystem of molten salt reactor system 100, for example, at the pump 104. As shown in FIG. 2, the sump system 200 includes a sump tank 202, a vertical pump 204, and a blind flange assembly 700 (as shown in more detail in FIGS. 7A, 7B, and 7C, and as described in greater detail below). In one or more embodiments, the flange assembly 700 is connected to the sump tank 202 at a fluid inlet or outlet (not shown in FIG. 2). In some embodiments, the pump 204 passes vertically through a pump opening in the flange assembly 700. In at least one embodiment, the pump 204 may exert rotational forces, vertical forces, and/or vibrations onto the flange assembly 700. Additionally, in certain embodiments, the sump system 200 may include a fluid at or about 700° C. Thus, in at least one embodiment, the flange assembly 700 should withstand the forces exerted on it by the pump 202 and the pressure and temperature of the system 200 to maintain a functional seal.

In many embodiments, the flange assembly 700 is connected in part by the fasteners 206. In one embodiment, the fasteners 206 may be a nut and bolt connection system, though the fasteners 206 may be any other connection device or system that allows the assembly 700 to be removably coupled together.

In some embodiments, the flange assembly 700 may also include one or more component openings so that one or more components (such as components 208, 210, and 212) can extend through a flange of the flange assembly 700 and be exposed to the fluid flowing through the flange assembly 700.

Figure 3B:
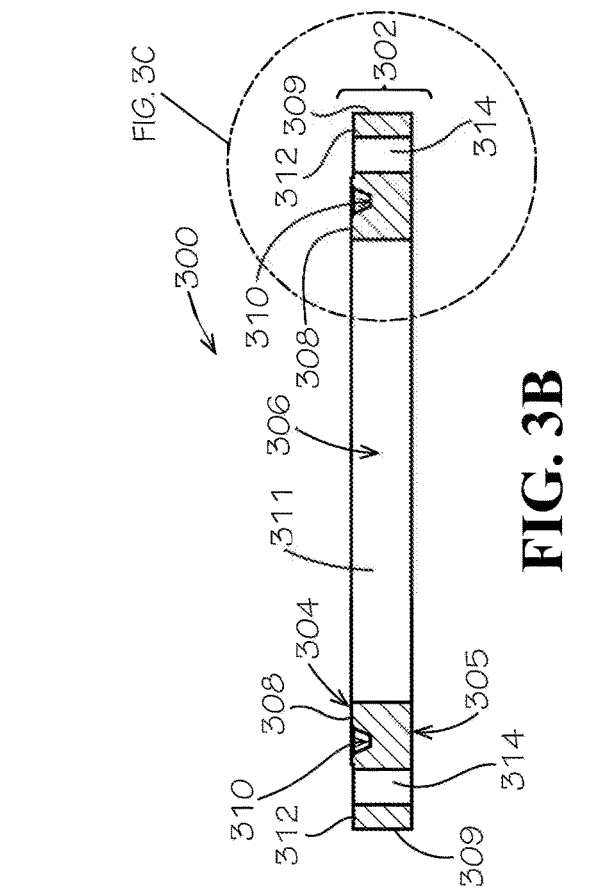
FIG. 3B illustrates a cross-sectional view of the exemplary stabilizing face ring joint flange of FIG. 3A taken along line 3B-3B of FIG. 3A, according to one embodiment of the present disclosure.
Figure 3A:
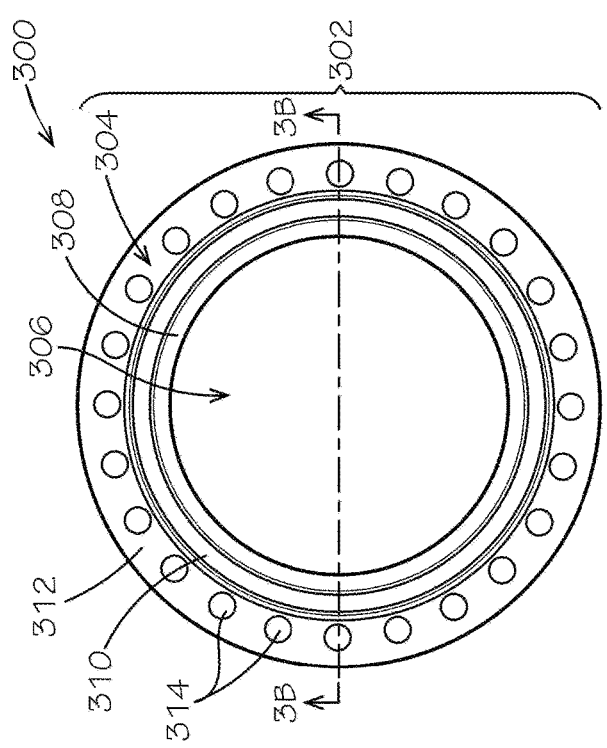
FIG. 3A illustrates a front view of an exemplary stabilizing face ring joint flange, according to one embodiment of the present disclosure.

Reference is now made to FIG. 3A, which illustrates a front view of an exemplary, overview of one embodiment of the stabilizing, open face ring joint flange 300. As will be understood and appreciated, the exemplary stabilizing, open face ring joint flange 300 shown in FIG. 3A represents merely one approach or embodiment of the present apparatus, and other aspects are used according to various embodiments of the present apparatus. In various embodiments, the stabilizing face ring joint flange 300 (also referred to herein as "flange 300") includes a flange body 302 having a first side 304 and a second side 305 (as shown in FIG. 3B) opposite the first side 304. The flange body 302 may be formed from a material of one or more of a stainless steel, hastelloy, monel, inconel, titanium, duplex steel, nickel alloy, super duplex steel, incoloy, alloy 20, 254 SMO, copper nickel, carbon steel, alloy steel, aluminum, bronze, mild steel, or brass. The flange body 302 may be a one-piece integrally formed structure. In other cases, at least some portion of the flange body 302 may be a composite structure, without one or more components connected or attached (such as being welded) to a main portion or mass of the flange body 302.

In one or more embodiments, the flange body 302 defines a fluid opening 306 extending between the first side 304 and the second side 305. In many embodiments, the flange body 302 also defines a flange mating surface 308 extending circumferentially about the fluid opening 306. In at least one embodiment, the flange body 302 also defines a ring groove 310 formed in the flange body 302 at the first mating surface 308, dividing the mating surface 308 into two portions. In multiple embodiments, the ring groove 310 may extend circumferentially about, and radially offset from, the fluid opening 306. In some embodiments, the flange body 302 also defines a flange peripheral surface 312 extending circumferentially about, and elevationally offset from, the flange mating surface 308. In certain embodiments, the flange body 302 also defines a plurality of fastener openings 314 that extend from the first side 304 to the second side 305 and positioned about the flange peripheral surface 312.

Figure 5A:
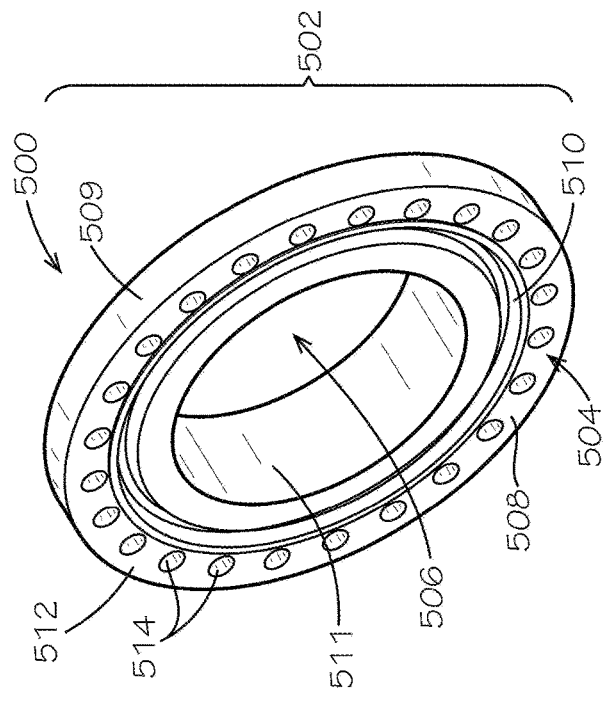
FIG. 5A illustrates a front view of an exemplary weld neck stabilizing face ring joint flange, according to one embodiment of the present disclosure.

In several embodiments, the flange 300 may be removably coupled to another flange, such as another flange 300, or a flange 400 (as shown in FIG. 4A) or a flange 500 (as shown in FIG. 5A). In one or more embodiments, the flange 300 may be coupled to another flange by inserting a fastener into each of the plurality of fastener openings 314 and connecting the fastener with the other flange (e.g., a bolt and nut arrangement).

Turning now to FIG. 3B, a cross-sectional view of an exemplary flange 300 is shown, taken along line A-A of FIG. 3A, according to one embodiment of the present disclosure. In multiple embodiments, as shown in FIG. 3B, the flange body 302 includes an outer wall 309 along the outer diameter of the flange peripheral surface 312, and an inner wall 311 that defines the inner diameter of the flange mating surface 308. Also, as shown in FIG. 3B, the flange body 302 includes the second side 305 opposite the first side 304.

Figure 3C:
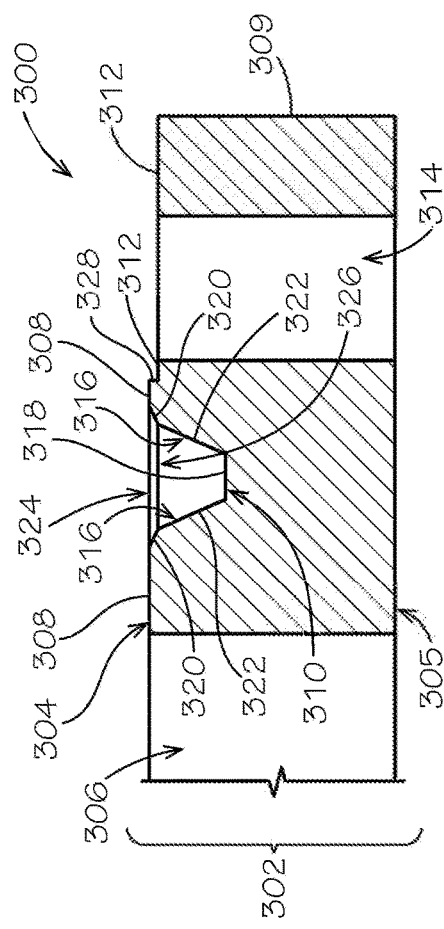
FIG. 3C illustrates detail 3C-3C of the exemplary stabilizing face ring joint flange of FIG. 3A, taken from FIG. 3B, according to one embodiment of the present disclosure.

Turning now to FIG. 3C, a side view of an exemplary flange 300 is shown, taken along Detail 3C-3C of FIG. 3B, according to one embodiment of the present disclosure. In several embodiments, as shown in FIG. 3C, the flange body 302 includes the first side 304, the second side 305, the mating surface 308, the peripheral surface 312, the ring groove 310, and a fastener opening 314a of the plurality of fastener openings 314.

In multiple embodiments, the ring groove 310 may extend into the flange body 302 at the mating surface 308, such that the ring groove 310 can accept at least a portion of a gasket 600. In certain embodiments, the ring groove 310 is configured to receive the gasket 600 in a manner that uniformly distributes a compressive load on the gasket 600 that forms a tight fluid connection. In many embodiments, the ring groove 310 may include two opposing graduated sides 316 and a base surface 318. In one or more embodiments, the two opposing graduated sides 316 may extend into the flange mating surface 308 on the first side 304 of the flange body 302, the two sides 316 extending at generally opposing, symmetric angles into the flange body 302 relative to the mating surface 308. In some embodiments, the two opposing graduated sides 316 connect to the base surface 318. In at least one embodiment, the two opposing graduated sides 316 and base surface 318 define the ring groove 310.

In several embodiments, the two opposing graduated sides 316 may each include a first portion 320 and a second portion 322, such that, for each of the two opposing graduated sides 316, the first portion 320 and the second portion 322 are combined to form the graduated side 316. In one or more embodiments, the first portion 320 may be angled into the flange body 302 at a different angle than the second portion 322, relative to the flange mating surface 308. In some embodiments, the first portion 320 may extend from the mating surface 308 into the flange body 302, and the second portion 322 may extend from the first portion 320 further into the flange body 302 and connects at the base surface 318.

In various embodiments, the opposing sides 316 and the base surface 318 form the ring groove 310, and thus also defines a groove opening 324 that spans from the point at which one of the first portions 320 connects with the mating surface 308 to the point at which the other first portion 320 connects with the mating surface 308 across the ring groove 310. In one or more embodiments, the points at which each of the first portions 320 connect to the second portions 322 forms a second opening 326 that is narrower than the groove opening 324. In many embodiments, as the gasket is placed into the ring groove 310, it extends through the groove opening 324 and through the second opening 326 and connects at each of the second portions 322.

In several embodiments, the peripheral surface 312 is vertically offset from the mating surface 308. In at least one embodiment, the flange body 302 includes a peripheral offset surface 328 that is perpendicular to each of the mating surface 308 and the peripheral surface 312 that connects the mating surface 308 to the peripheral surface 312. In some embodiments, the peripheral offset surface 328 may be any length, and in a preferred embodiment, may be about 0.0625 inches long, thus making the peripheral surface 312 vertically offset to the mating surface 308 by the length of the peripheral offset surface 328.

In at least one embodiment, the peripheral offset surface 328 may have a height of about 0.0625 inches (i.e., the height difference between the mating surface 308 and the peripheral surface 312 is about 0.0625 inches), though the peripheral offset surface 328 may have a larger or smaller height. In many embodiments, the width of the groove opening 324 of the ring groove 310 may be about 1.00 inches, though it may have larger or smaller width depending on the design of the gasket 600. In certain embodiments, the groove opening 324 and the second opening 326 may have a height difference between the two of about 0.06 inches, though the height difference may be larger or smaller, depending on the design needs of the flange 300. In certain embodiments, the height difference between the mating surface 308 and the base surface 318 of the ring groove 310 may be about 0.720 inches, though the height difference may be larger or smaller, depending on the design needs of the flange 300 and gasket 600. In many embodiments, the second portions 322 of the opposing side walls 316 extend into first side 304 at about 67 degrees relative to the mating surface 308 (though at opposing 67 degree angles). Additional dimensions for components of the flange 300 may be standard sizes for flanges in industrial systems, such as the sizes as listed in the ANSI/API Specification 6A "SPECIFICATION FOR WELLHEAD AND CHRISTMAS TREE EQUIPMENT" (ISO10423:2003), which is incorporated herein in total by reference.

Now turning to FIG. 4A, a front view of an exemplary stabilizing, blind face ring joint flange 400 is shown, according to one embodiment of the present disclosure. In many embodiments, the stabilizing, blind face ring joint flange 400 (also referred to herein as "blind flange 400") may be substantially analogous to the flange 300. For example, each may include a flange body having a first and second side, a mating surface, a ring groove, and a peripheral mating surface. In this regard, the blind flange 400 includes flange body 402 defining a first side 404, a second side 405, a mating surface 408, a ring groove 410, a peripheral surface 412, and a plurality of fastener openings 414. However, in several embodiments, the blind flange 400 does not include a fluid opening, as the mating surface 408 extends circumferentially from a center point 407 of the flange body 402 to the peripheral surface 412. In some embodiments, the blind flange 400 may include other openings that extend through the flange body 402, such as a pump opening and component openings (see FIG. 2). These openings allow pumps or components to extend through the flange 400 while not allowing fluid to pass directly through.

Thus, in various embodiments, when blind flange 400 is removably coupled with flange 300 (or flange 500) as a flange assembly connected to piping or some other component in a high temperature system, the mating surface 408 of the flange 400 prevents flow of any fluid through the flange assembly.

Now turning to FIG. 4B, a cross-sectional view of an exemplary flange 400 is shown, taken along line 4B-4B of FIG. 4A, according to one embodiment of the present disclosure. In multiple embodiments, as shown in FIG. 4B, the flange body 402 includes an outer wall 409 along the outer diameter of the flange peripheral surface 412. Also, as shown in FIG. 4B, the flange body 402 includes the second side 405 opposite the first side 404.

Now turning to FIG. 4C, a side view of an exemplary blind flange 400 is shown, taken along Detail 4C of FIG. 4B, according to one embodiment of the present disclosure. In many embodiments, the blind flange 400, as shown in FIG. 4C, is substantially analogous to the flange 300. For example, each may include a ring groove that includes two opposing side walls and a base surface, and each of the two opposing side walls may be made up of a first portion and a second portion. Additionally, each may include a peripheral offset surface that connects the mating surface to the peripheral surface. As shown in FIG. 4C, in many embodiments, the ring groove 410 includes two opposing graduated side walls 416 and a base surface 418. In one or more embodiments, the side walls 416 may each be defined by a first portion 420 and a second portion 422. In several embodiments, the first portions 420 may each connect to the mating surface 408 and create a groove opening 424, and the second portions 422 may connect to the first portions 420 and create a second opening 426.

Figure 5B:
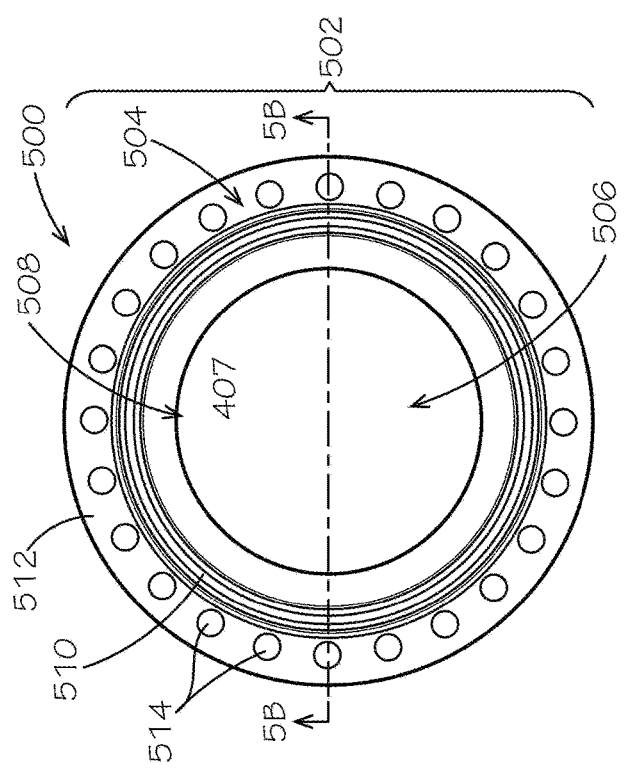
FIG. 5B illustrates a perspective view of the exemplary weld neck stabilizing face ring joint flange of FIG. 5A, according to one embodiment of the present disclosure.

Now turning to FIG. 5A and FIG. 5B, a front view and a perspective view of an exemplary stabilizing face ring joint weld neck flange 500 is shown, according to one embodiment of the present disclosure. In several embodiments, the stabilizing face ring joint weld neck flange (also referred to herein as "weld neck flange 500") may be substantially analogous to the flange 300. For example, each may include a flange body having a first and second side, a mating surface, a ring groove, and a peripheral mating surface. In this regard, the weld neck flange 500 includes flange body 502 defining a first side 504, a second side 505, a fluid opening 506, a mating surface 508, a ring groove 510, a peripheral surface 512, and a plurality of fastener openings 514. Additionally, weld neck flange 500 includes an outer wall 509 and an inner wall 511.

Figure 5C:
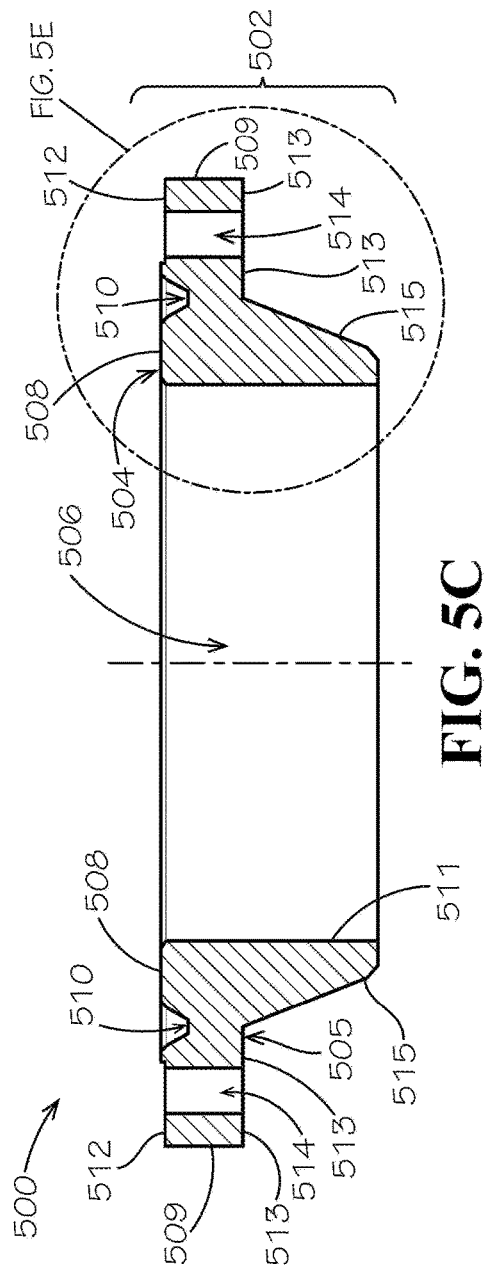
FIG. 5C illustrates a cross-sectional view of the exemplary weld neck stabilizing face ring joint flange of FIG. 5A, taken along line 5C-5C of FIG. 5A, according to one embodiment of the present disclosure.

Now turning to FIGS. 5C and 5D, a cross-sectional view of an exemplary weld neck flange 500, taken along line 5C-5C of FIG. 5A, and a side view of an exemplary weld neck flange 500 are shown, according to one embodiment of the present disclosure. In multiple embodiments, as shown in FIG. 5C and FIG. 5D, the flange body 502 includes the second side 505 opposite the first side 504. However, in several embodiments, the second side 505 of the weld neck flange 500 includes a second side surface 513 that is parallel to the mating surface 508 and the peripheral surface 512, which connects to a graduated neck surface 515 that extends out from the flange body 502 at an angle and connects at an opposite end to the inner side wall 511. Stated differently, the graduated neck surface 515 extends circumferentially around the fluid opening 506 and extends the length of the inner side wall 511, relative to the inner side wall 311.

In at least one embodiment, the weld neck flange 500 may be utilized in welding the flange 500 to piping in a system. In certain embodiments, the graduated neck surface 515 may be welded to the piping so that the mating surface 508 and ring groove 510 are not deformed by the heat of the welding.

Now turning to FIG. 5E, a side view of an exemplary weld neck flange 500 is shown, taken along Detail 5E of FIG. 5C, according to one embodiment of the present disclosure. In many embodiments, the weld neck flange 500, as shown in FIG. 5E, is substantially analogous to the flange 300 and blind flange 400. For example, each may include a ring groove that includes two opposing side walls and a base surface, and each of the two opposing side walls may be made up of a first portion and a second portion. Additionally, each may include a peripheral offset surface that connects the mating surface to the peripheral surface. As shown in FIG. 5E, in many embodiments, the ring groove 510 includes two opposing graduated side walls 516 and a base surface 518. In one or more embodiments, the side walls 516 may each be defined by a first portion 520 and a second portion 522. In several embodiments, the first portions 520 may each connect to the mating surface 408 and create a groove opening 524, and the second portions 522 may connect to the first portions 520 and create a second opening 526.

Figure 6:
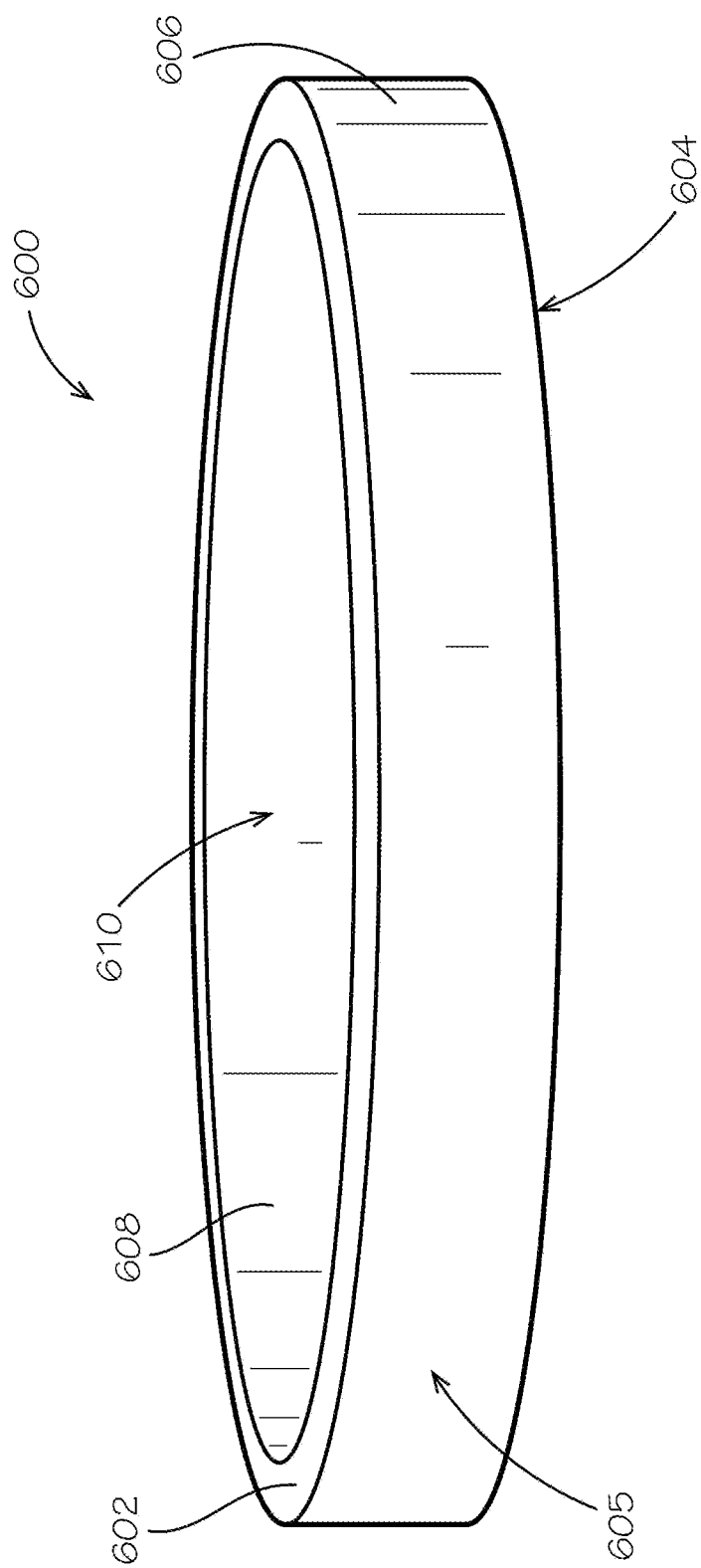
FIG. 6 illustrates a perspective view of an exemplary gasket, according to one embodiment of the present disclosure.

Now turning to FIG. 6, a perspective view of an exemplary gasket is shown, according to one embodiment of the present disclosure. In various embodiments, the gasket 600 may include a main body 601 defined by a top surface 602, a bottom surface 604, an outer surface 606, and an inner surface 608. In many embodiments, the gasket 600 may define a gasket opening 610 that extends from the top surface 602 through the bottom surface 604 and is bound by inner surface 608. In at least one embodiment, the gasket 600 may include a rectangular cross-sectional area. In certain embodiments, the gasket may be made of stainless steel, or any other material as may be known in the art that effectively prevents any fluid from leaking through the flange assembly connection. In one embodiment, the gasket 600 is a ring joint gasket.

In multiple embodiments, the bottom surface 604 of the gasket 600 may be placed into a ring groove (e.g., ring groove 310, 410, or 510) of a first flange (e.g., flange 300, blind flange 400, or weld neck flange 500), and then second flange (e.g., flange 300, blind flange 400, or weld neck flange 500, depending on the type of first flange) may be placed on top of the gasket 600 such that the top surface 602 of the gasket 600 is placed in the ring groove (e.g., ring groove 310, 410, or 510) of the second flange. In many embodiments, the mating surface (e.g., mating surface 308, 408, or 508) of the first flange is in contact with the mating surface (e.g., mating surface 308, 408, or 508, depending on the type of first flange) of the second flange when the gasket 600 is placed in the ring groove of each of the flanges.

Now turning to FIG. 7A, a perspective view of an exemplary stabilizing face ring joint flange assembly 700 is shown, according to one embodiment of the present disclosure. In multiple embodiments, the stabilizing face ring joint flange assembly 700 (also referred to herein as "blind assembly 700") includes a flange 300, a gasket 600 seated in the ring groove 310 of the flange 300, and a blind flange 400 arranged to contact the gasket 600 and the flange 300. In many embodiments, the blind assembly 700 may be utilized in piping to prevent fluid flow, since the blind flange 400 of the blind assembly does not include a fluid opening for fluid to flow through.

Now turning to FIG. 7B, a cross-sectional view of an exemplary blind assembly 700 is shown, taken along line 7B-7B of FIG. 7A, according to one embodiment of the present disclosure. In several embodiments, in the blind flange assembly 700, the gasket 600 is placed in either the ring groove 310 of the flange 300 or the ring groove 410 of the blind flange 400, and then the other flange (either the flange 300 or flange 400) is placed on top of the gasket 600 so the gasket 600 fits into the opposing ring groove. In some embodiments, the mating surface 308 of the flange 300 is also in contact with the mating surface 408 of the blind flange 400 while the gasket 600 positioned in each of the ring grooves 310 and 410. In one or more embodiments, once the gasket 600 is positioned in the ring grooves, the fasteners (such as, but not limited to, a bolt) are inserted through the plurality of fastener openings 414 and 314 to removably couple the flange 300 to the flange 400. In certain embodiments, the fasteners may be coupled via one or more nuts after being inserted through the fastener openings 314 and 414. In another embodiment, the plurality of fasteners may be welded to the fastener openings to create a more permanent coupling.

Figure 7C:
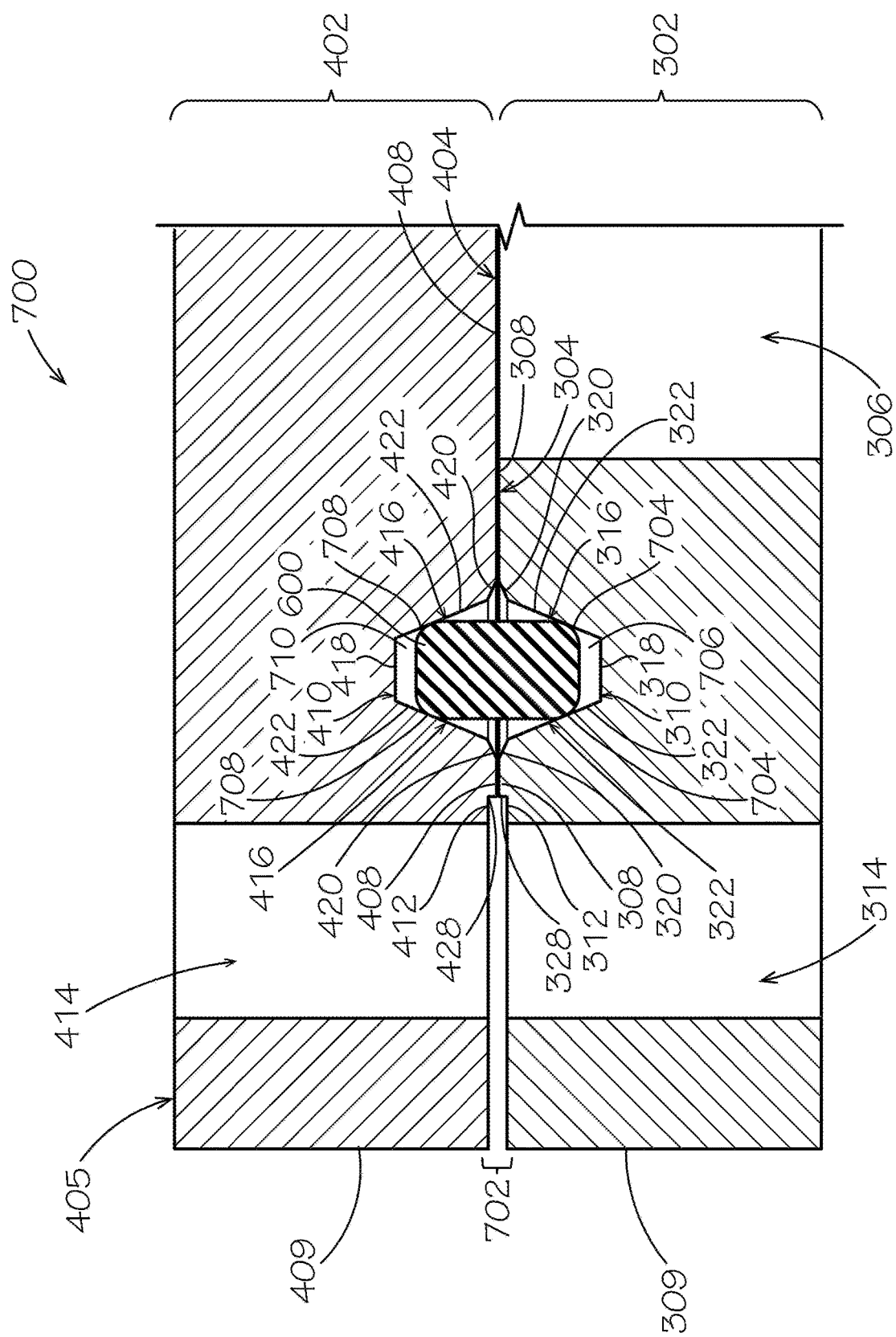
FIG. 7C illustrates detail 7C-7C of the exemplary blind flange assembly of FIG. 7A, taken from FIG. 7B, according to one embodiment of the present disclosure.

Now turning to FIG. 7C, Detail 7C of FIG. 7B of the exemplary blind assembly 700 is shown, according to one embodiment of the present disclosure. In various embodiments, as shown in more detail in FIG. 7C, the gasket 600 is positioned so that it is within the ring groove 310 of the flange 300 and the ring groove 410 of the blind flange 400. In many embodiments, the mating surface 308 of the flange 300 is in contact with the mating surface 408 of the blind flange 400 with the gasket 600 fully compressed within the ring grooves 310 and 410.

In multiple embodiments, the gasket 600 contacts each of the graduated opposing side walls 316 and 416 when positioned within the ring grooves 310 and 410. In certain embodiments, one end of the gasket 600 (e.g., the top surface 602) contacts each of the second portions 322 of the opposing side walls 316 at two connection points 704, and is vertically offset from the base surface 318, defining a groove gap 706 between the surface of the end of the gasket 600 (e.g., the top surface 602) and the base surface 316 and bound by the second portion 322 of each of the side walls 316 that span between the connection points 704 and the base surface 318. Similarly, in many embodiments, the opposing end of the gasket 600 (e.g., the bottom surface 604) contacts each of the second portions 422 of the opposing side walls 416 at two connection points 708, and is vertically offset from the base surface 418, defining a groove gap 710 between the surface of the opposing end of the gasket 600 (e.g., the bottom surface 604) and the base surface 418 and bound by the second portion 422 of each of the side walls 416 that span between the connection points 708 and the base surface 418. In other embodiments, the gasket may contact the base surfaces 318 and 418. In some embodiments, the groove gap 706 and the groove gap 710 are substantially trapezoidal.

In various embodiments, the configuration of the gasket 600 seated on the opposing side walls 316 of flange 300 and 416 of blind flange 400 (or, in other embodiments, on the base surfaces 318 and 418) allows the compression on the gasket 600 to be uniform and the mating surfaces 308 and 408 of the flanges 300 and 400 to be in contact while the flange assembly 700 is installed within a system (such as, but not limited to, reactor system 100). This configuration that establishes a physical connection between the mating surfaces 310 and 410 ensures that the rotation of a pump or any potential perpendicular or horizontal loading do not provide undue stress on the gasket 600, which would otherwise cause the gasket 600 to deform or cause a seal to fail.

In at least one embodiment, the two ring grooves 310 and 410 of blind assembly 700 are substantially aligned when the gasket 600 is positioned within both the ring grooves 310 and 410. In certain embodiments, when aligned, the ring grooves 310 and 410 form a space such that the gasket 600 can fit in the space and the mating surfaces 308 and 408 are in contact. In one or more embodiments, the space formed by the aligned ring grooves 310 and 410 may be defined by the base surfaces 318 and 418 and the graduated opposing side walls 316 and 416. In some embodiments, the space formed by the ring grooves 310 and 410 may be trapezoidal, hexagonal, octagonal, or any other shape.

In several embodiments, due to the vertical offset of the peripheral surfaces 312 and 412 from their respective mating surfaces 308 and 408, a peripheral gap 702 is formed in between the peripheral surface 312 of flange 300 and the peripheral surface 412 of the blind flange 400. In at least one embodiment, the peripheral gap 702 may be as wide as the combined vertical heights of the peripheral offset surface 328 and the peripheral offset surface 428.

In at least one embodiment, the flange assembly 700 also includes one or more fasteners 206. In some embodiments, the one or more fasteners 206 include a bolt that extends through the fastener opening 414, the peripheral gap 702, and the fastener opening 314, and a nut is removably coupled to the bolt to couple the flange 300 to the blind flange 400.

In multiple embodiments, with flange assembly 700 assembled with the gasket 600 seated and uniformly compressed within the ring groove 310 of flange 300 and ring groove 410 of blind flange 400, and the mating surface 308 of flange 300 and the mating surface 408 of blind flange 400 in physical contact, the flange assembly 700 defines a fluid tight connection between the fluid opening 306 of flange 300 and the blind flange 400. Thus, in many embodiments, the assembly 700 is able to operate in harsh environments, such as the molten salt reactor system 100.

Figure 8A:
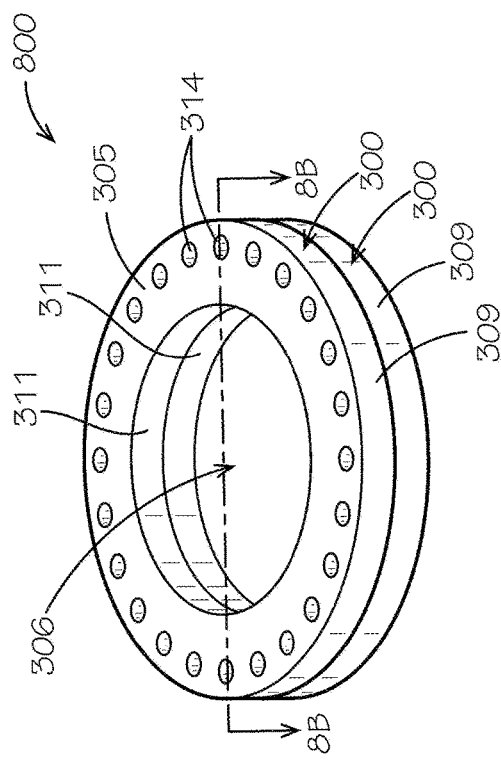
FIG. 8A illustrates a perspective view of an exemplary flange assembly, according to one embodiment of the present disclosure.
Figure 8B:
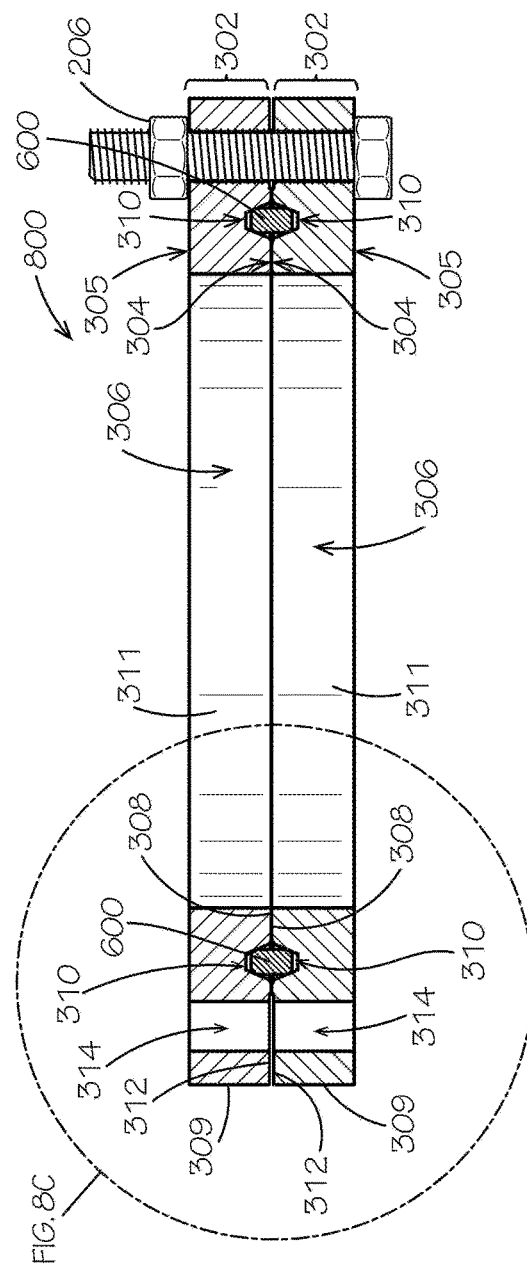
FIG. 8B illustrates a cross-sectional view of the exemplary flange assembly of FIG. 8A, taken along line 8B-8B of FIG. 8A, according to one embodiment of the present disclosure.
Figure 8C:
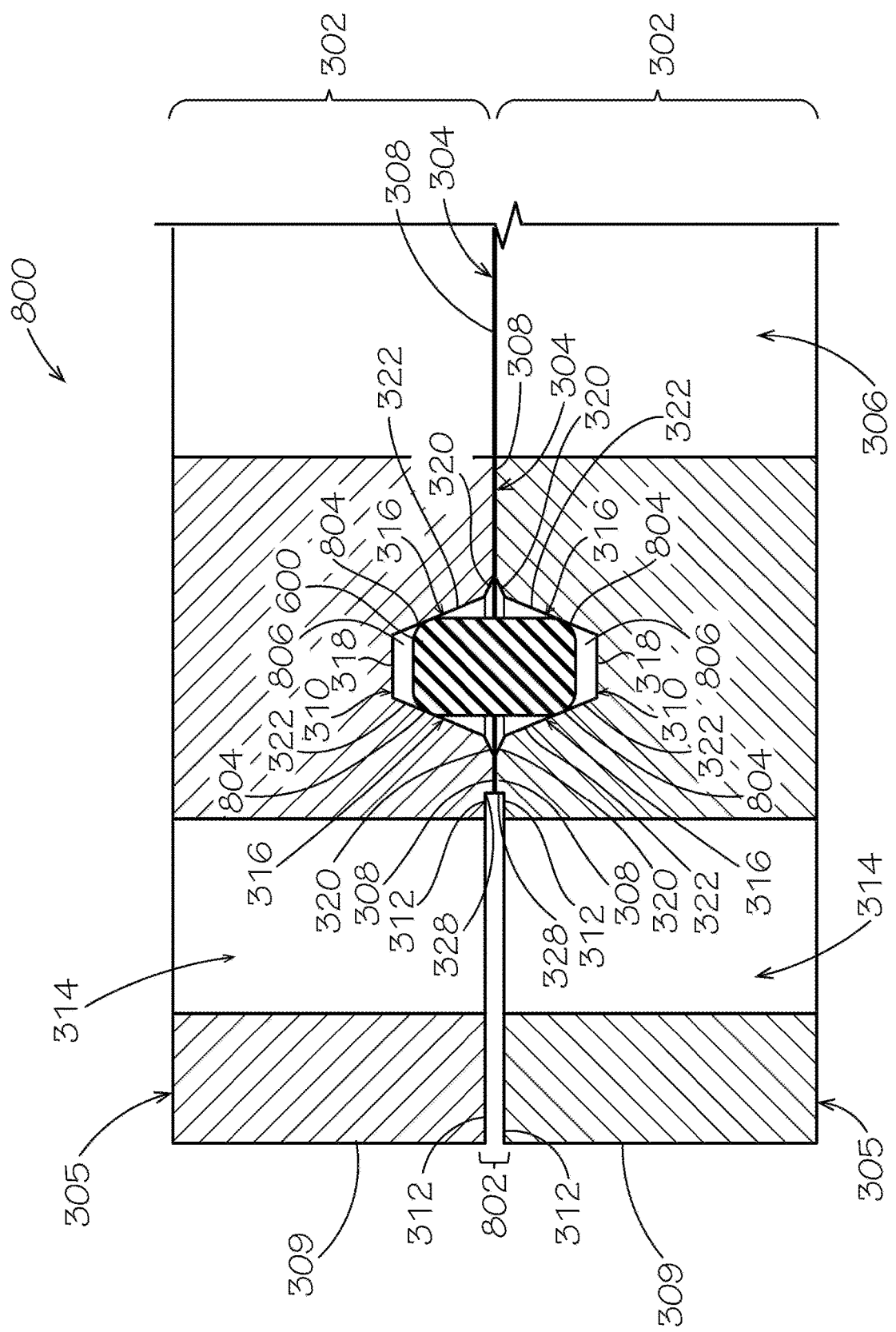
FIG. 8C illustrates detail 8C-8C of the exemplary flange assembly of FIG. 8A, taken from FIG. 8B, according to one embodiment of the present disclosure.

Now turning to FIGS. 8A, 8B, and 8C, a perspective view of an exemplary stabilizing face ring joint flange assembly 800 is shown, a cross-sectional view of an exemplary stabilizing face ring joint flange assembly 800 is shown, taken across the line 8B-8B of FIG. 8A, and Detail 8C of FIG. 8B of the exemplary stabilizing face ring joint flange assembly 800 of FIG. 8A, according to one embodiment of the present disclosure. In multiple embodiments, the stabilizing face ring joint flange assembly 800 (also referred to herein as "flange assembly 800") includes a first flange 300, a gasket 600 seated in the ring groove 310 of the first flange 300, and a second flange 300 arranged to contact the gasket 600 and the first flange 300. In many embodiments, the flange assembly 800 may be substantially analogous to the blind assembly 700. For example, each may include two flanges removably coupled together, via fasteners through the fastener openings, with a gasket 600 positioned in the two ring grooves of the flanges, the mating surfaces of the flanges are in contact, peripheral offset gaps, connection points where the gasket 600 contacts each of the graduated opposing side walls, and groove gaps between the gasket and the base surface of each ring groove. In this regard, the flange assembly 800 includes a first flange 300 and a second flange 300, with a gasket 600 positioned in the ring grooves 310 of each of the first and second flanges 300. However, in several embodiments, the flange assembly 800 includes a continuous fluid opening, as the fluid openings 310 of each of the first and second flanges 300 are in fluid connectivity, whereas the blind assembly 700 did not include a continuous fluid opening between both flanges.

In at least one embodiment, the flange assembly 800 also includes one or more fasteners 206. In some embodiments, the one or more fasteners 206 include a bolt that extends through the fastener opening 314, the peripheral gap 802, and the other fastener opening 314, and a nut is removably coupled to the bolt to couple the first and second flanges 300 together.

As shown in FIG. 8C, the flange assembly 800 is substantially analogous to the blind assembly 700. In this regard, the flange assembly 800 also includes a peripheral offset gap 802 between the peripheral surfaces 312 of each of the first and second flange 300. In many embodiments, the flange assembly 800 also includes two connection points 804 where the gasket 600 contacts the ring groove 310 at the second portion 322 of the opposing side walls 316 for each of the first and second flanges 300. In one or more embodiments, the flange assembly 800 also includes two groove gaps 806, one for each of the first and second flanges 300, in between the base surface 318 of each of the first and second flanges 300 and the gasket 600. In various embodiments, the flange assembly 800, like the flange assembly 700, may operate in harsh environments, such as the molten salt reactor system 100, due to the fluid tight connection created by the flange assembly 800. In at least one embodiment, the flange assembly 800 may be configured so that fluid can flow through the fluid openings 306 of the first and second flanges 300 while preventing leakage of the fluid.

Figure 9A:
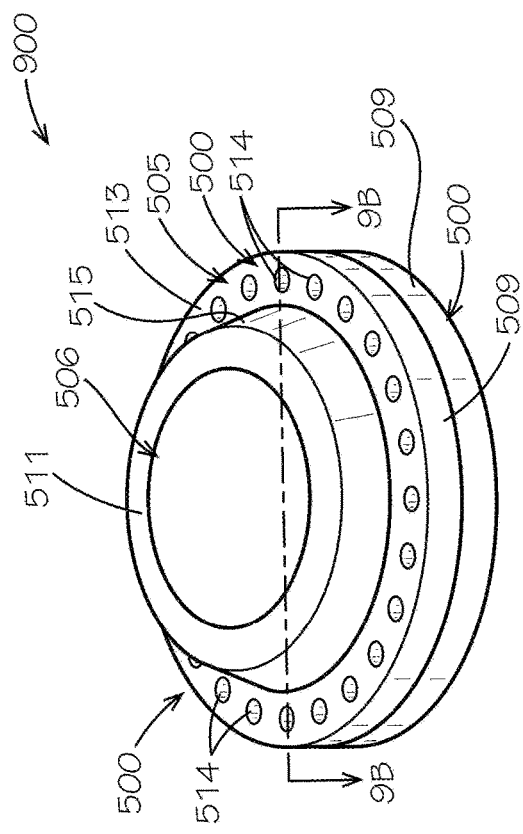
FIG. 9A illustrates a perspective view of an exemplary weld neck flange assembly, according to one embodiment of the present disclosure.
Figure 9B:
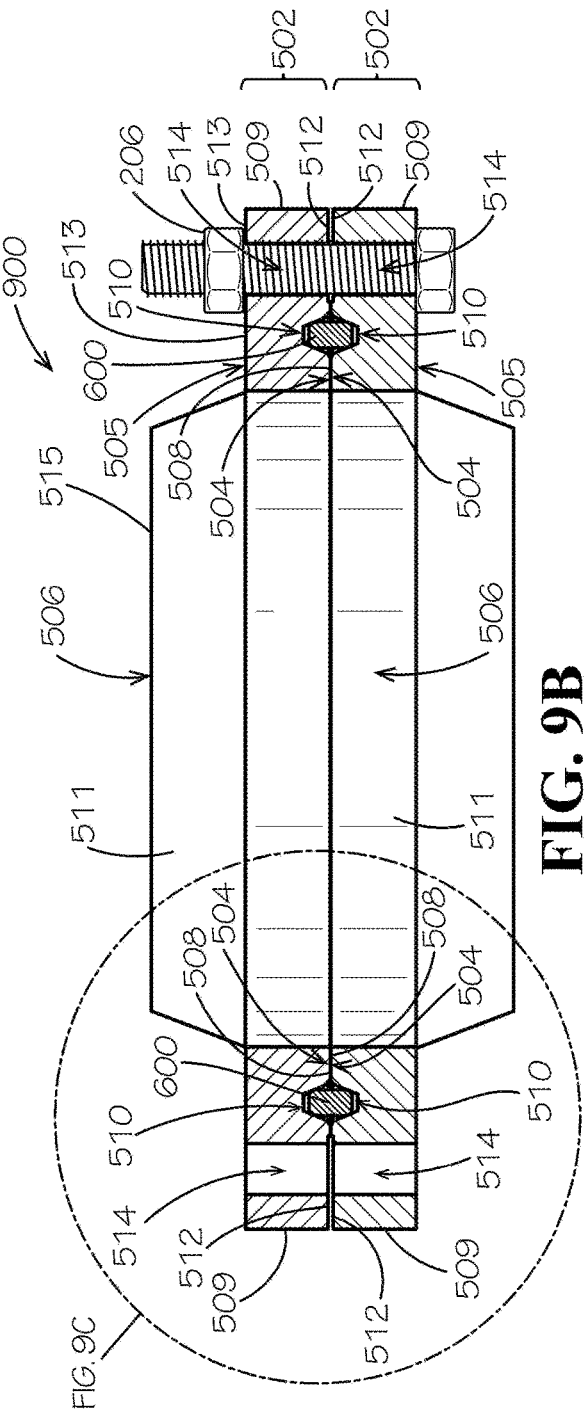
FIG. 9B illustrates a cross-sectional view of the exemplary weld neck flange assembly of FIG. 9A, taken along line 9B-9B of FIG. 9A, according to one embodiment of the present disclosure.
Figure 9C:
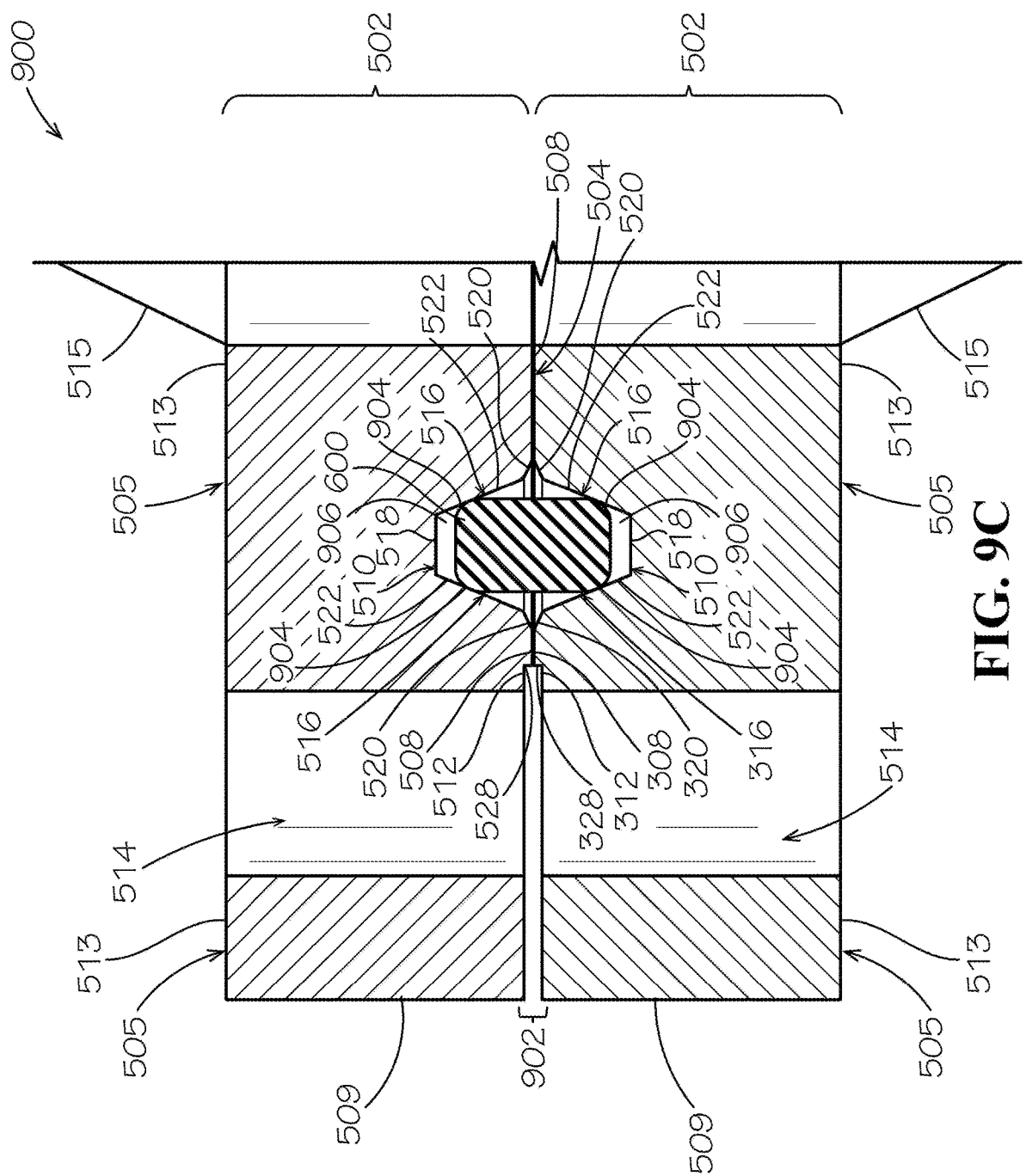
FIG. 9C illustrates detail 9C-9C of the exemplary weld neck flange assembly of FIG. 9A, taken from FIG. 9B, according to one embodiment of the present disclosure.

Now turning to FIGS. 9A, 9B, and 9C, a perspective view of an exemplary weld neck flange assembly 900 is shown, a cross-sectional view of the exemplary weld neck flange assembly 900 of FIG. 9A is shown, taken across the line 9B-9B of FIG. 9A, and Detail 9C of the exemplary weld neck flange assembly 900 of FIG. 9A, taken from FIG. 9B, is shown, according to one embodiment of the present disclosure. In many embodiments, the flange assembly 900 may be substantially analogous to the blind assembly 700.

For example, each may include two flanges removably coupled together, via fasteners through the fastener openings, with a gasket 600 positioned in the two ring grooves of the flanges, the mating surfaces of the flanges are in contact, peripheral offset gaps, connection points where the gasket 600 contacts each of the graduated opposing side walls, and groove gaps between the gasket and the base surface of each ring groove. In this regard, in multiple embodiments, the weld neck flange assembly 900 includes a first weld neck flange 500, a gasket 600 seated in the ring groove 510 of the first weld neck flange 500, and a second weld neck flange 500 arranged to contact the gasket 600 and the first weld neck flange 500. However, in several embodiments, the flange assembly 900 includes a continuous fluid opening, as the fluid opening 510 of the first weld neck flange 500 and the fluid opening 510 of the second weld neck flange 500 are in fluid connectivity, whereas the blind assembly 700 did not include a continuous fluid opening between both flanges. Additionally, the weld neck flange 500 assembly includes a graduated neck 515 that extends from the second side 505 of the weld neck flange 500, whereas the blind assembly 700 did not include a raised surface on the second side of either flange in the blind assembly 700.

As shown in FIG. 9C, the weld neck flange assembly 900 is substantially analogous to the blind flange assembly 700 and the flange assembly 800. For example, the weld neck flange assembly 900 includes a peripheral offset gap 902 between the peripheral surface 512 of the first weld neck flange 500 and the peripheral surface 512 of the second weld neck flange 500. In many embodiments, the weld neck flange assembly 900 also includes two connection points 904 on each of the first and second weld neck flanges 500, where the gasket 600 contacts the ring groove 510 at the second portion 522 of the opposing side walls 516. In at least one embodiment, for each of the first and second weld neck flanges 500, the weld neck flange assembly 900 also includes a groove gap 906 that is formed in between the base surface 518 of the weld neck flange 500 and the opposing surface of the gasket 600 (e.g., the top surface 602 or the bottom surface 604), and is bound by the second portion 522 of the side walls 516 in between the connection points 908 and the base surface 518.

In several embodiments, due to the vertical offset of the peripheral surfaces 512 from their respective mating surfaces 508, a peripheral gap 902 is formed in between the peripheral surfaces 512 of the first and second weld neck flanges 500. In at least one embodiment, the peripheral gap 902 may be as wide as the combined vertical heights of the peripheral offset surfaces 528 of the first and second weld neck flanges 500.

In at least one embodiment, the flange assembly 900 also includes one or more fasteners 206. In some embodiments, the one or more fasteners 206 include a bolt that extends through the fastener opening 514, the peripheral gap 902, and the other fastener opening 514, and a nut is removably coupled to the bolt to couple the weld neck flanges 500 together.

In various embodiments, the weld neck flange assembly 900, like the blind flange assembly 700 and flange assembly 800, may operate in harsh environments, such as the molten salt reactor system 100, due to the fluid tight connection created by the flange assembly 900. In at least one embodiment, the flange assembly 900 may be configured so that fluid can flow through the fluid openings 506 of the first and second weld neck flanges 500 while preventing leakage of the fluid.

Though the flange assemblies 700, 800, and 900 have been described herein in certain embodiments, any combination of flanges as described herein may be assembled in such a way so that the resulting flange assembly is substantially analogous to the blind flange assembly 700, the flange assembly 800, and the weld neck flange 900.

Figure 10A:
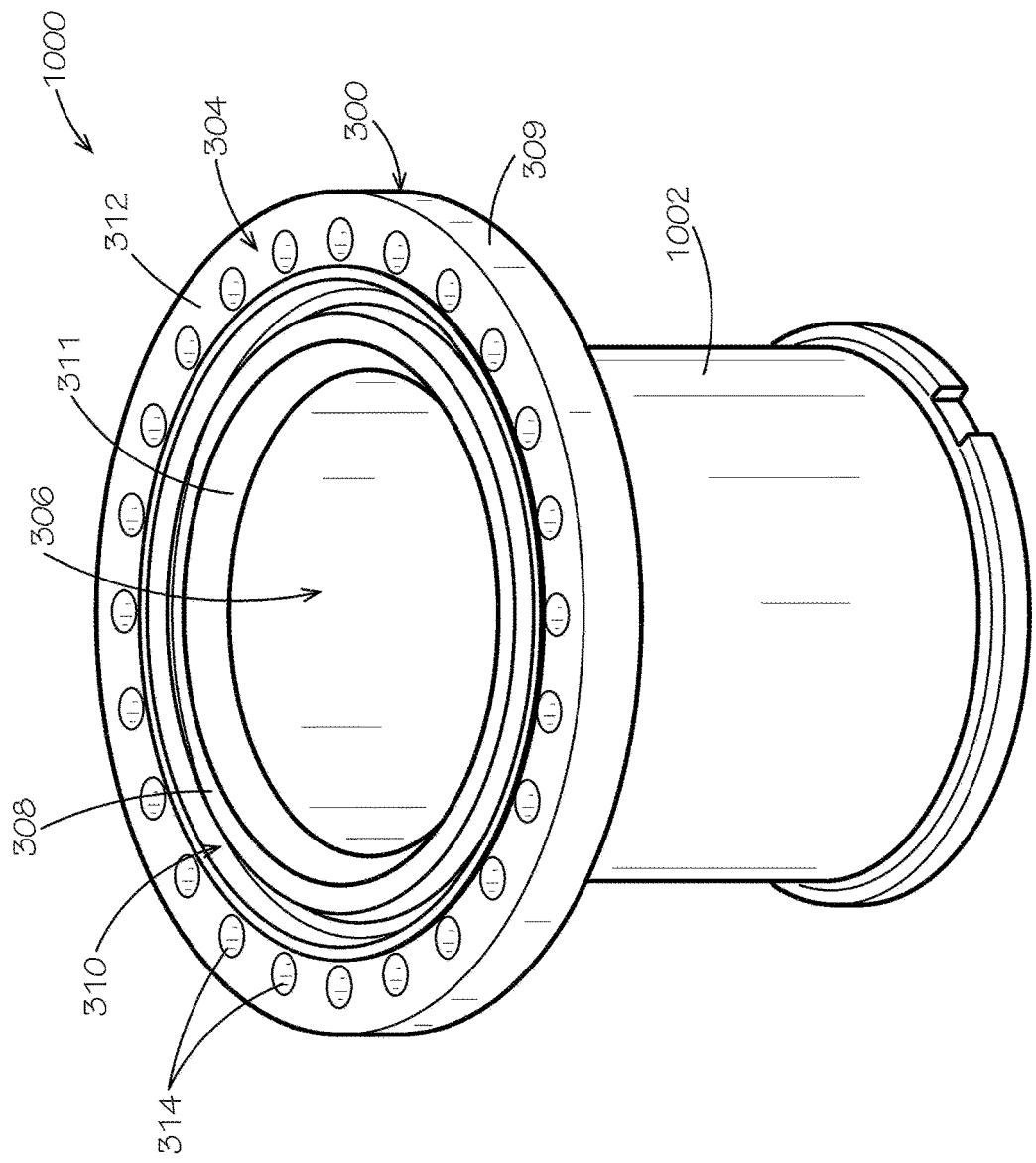
FIG. 10A illustrates a perspective view of an exemplary flange connected to piping, according to one embodiment of the present disclosure.

Now turning to FIG. 10A, a perspective view 1000 of an exemplary flange 300 connected to piping is shown, according to one embodiment of the present disclosure. In various embodiments, the flange 300 is connected to pipe 1002, such that the flange 300 is fluidly connected to the pipe 1002 (via the fluid opening 306). In at least one embodiment, the flange 300 may be connected to the pipe 1002 before a second flange (e.g., a second flange 300, a blind flange 400, or a weld neck flange 500) is connected to the flange 300 to form a flange assembly 700, 800, or 900. In one or more embodiments, the pipe 1002 may be connected, at an opposing end to the flange 300, to an end cap, longer piping, or other components. In some embodiments, when the pipe 1002 is capped at the end opposite to the flange 300, a sump vessel may be formed such that a portion of a pump may be submerged into the pipe 1002 so that it can pull fluid (e.g., molten fuel salt) from a system.

Figures 10B, 10C:
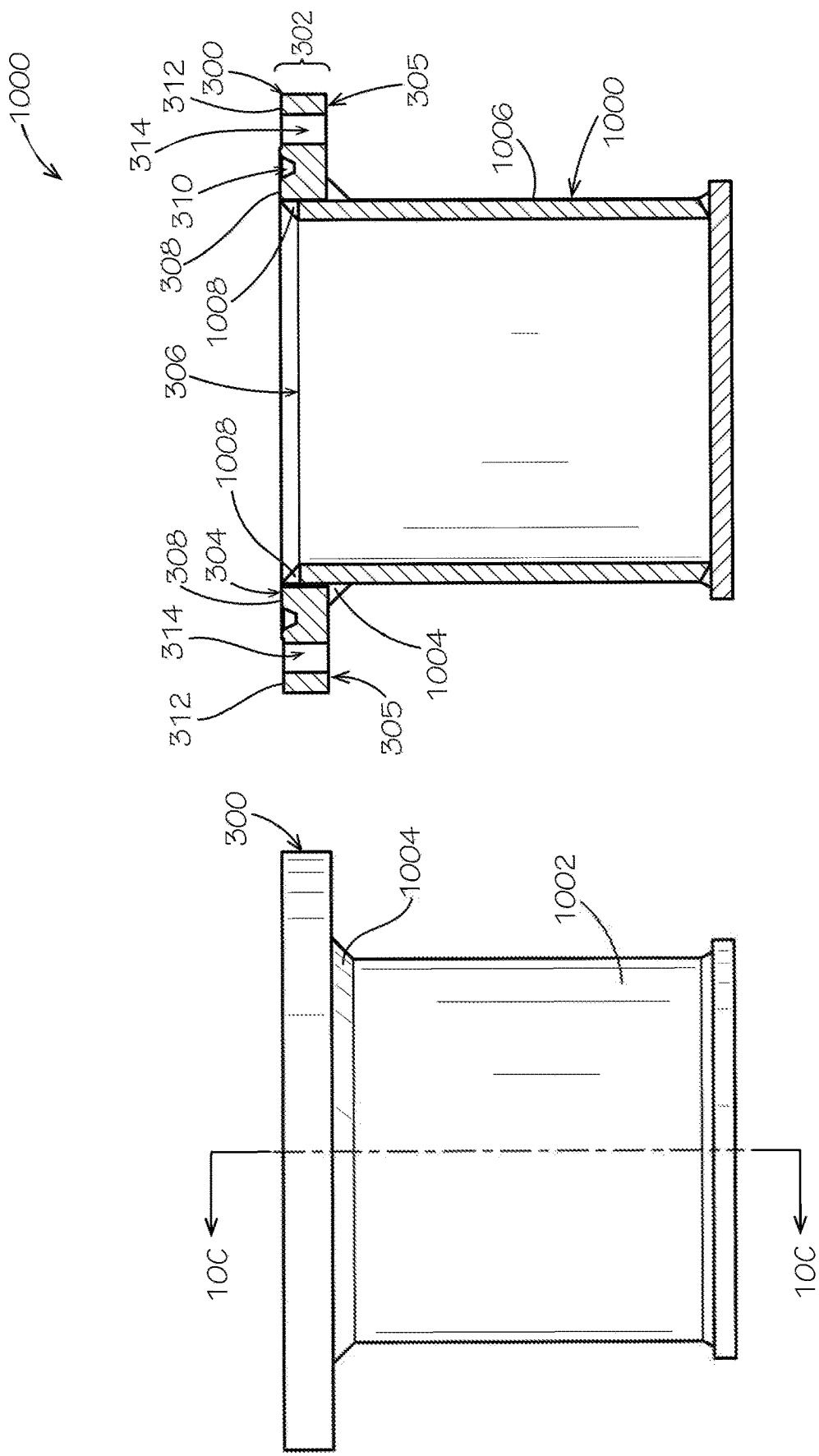
FIG. 10B illustrates a side view of the exemplary flange connected to piping of FIG. 10A, according to one embodiment of the present disclosure.
FIG. 10C illustrates a cross-sectional view of the exemplary flange connected to piping of FIG. 10A, taken along line 10B-10B of FIG. 10B, according to one embodiment of the present disclosure.

Turning to FIG. 10B, a side view of an exemplary flange 300 connected to a pipe 1002 is shown, according to one embodiment of the present disclosure. In several embodiments, the pipe 1002 includes a first weld 1004. In one or more embodiments, the first weld 1004 may connect the second surface 305 of the flange 300 to the pipe 1002.

Turning to FIG. 10C, a cross-sectional view of an exemplary flange 300 connected to a pipe 1002, taken along the line 10C-10C of FIG. 10B, is shown, according to one embodiment of the present disclosure. In multiple embodiments, as shown in FIG. 10C, the pipe 1002 also includes a pipe wall 1006 that has an outer diameter that is smaller than the diameter of the fluid opening 306 of the flange 300, and may also include a second weld 1008. In some embodiments, the second weld 1008 may further connect the pipe 1002 to the inner wall 311 of the flange 300.

In one or more embodiments, the flange 300 may be positioned on the pipe 1002 so that the pipe 1002 extends through the fluid opening 306. In several embodiments, the outer surface 1006 of the pipe 1002 may be welded to the second surface 305 of the flange 300 to create the first weld 1004. In at least one embodiment, the pipe 1002 may also be welded to the flange 300 at the inner wall 311 and/or the mating surface 308 to create the weld 1008.

Figure 11:
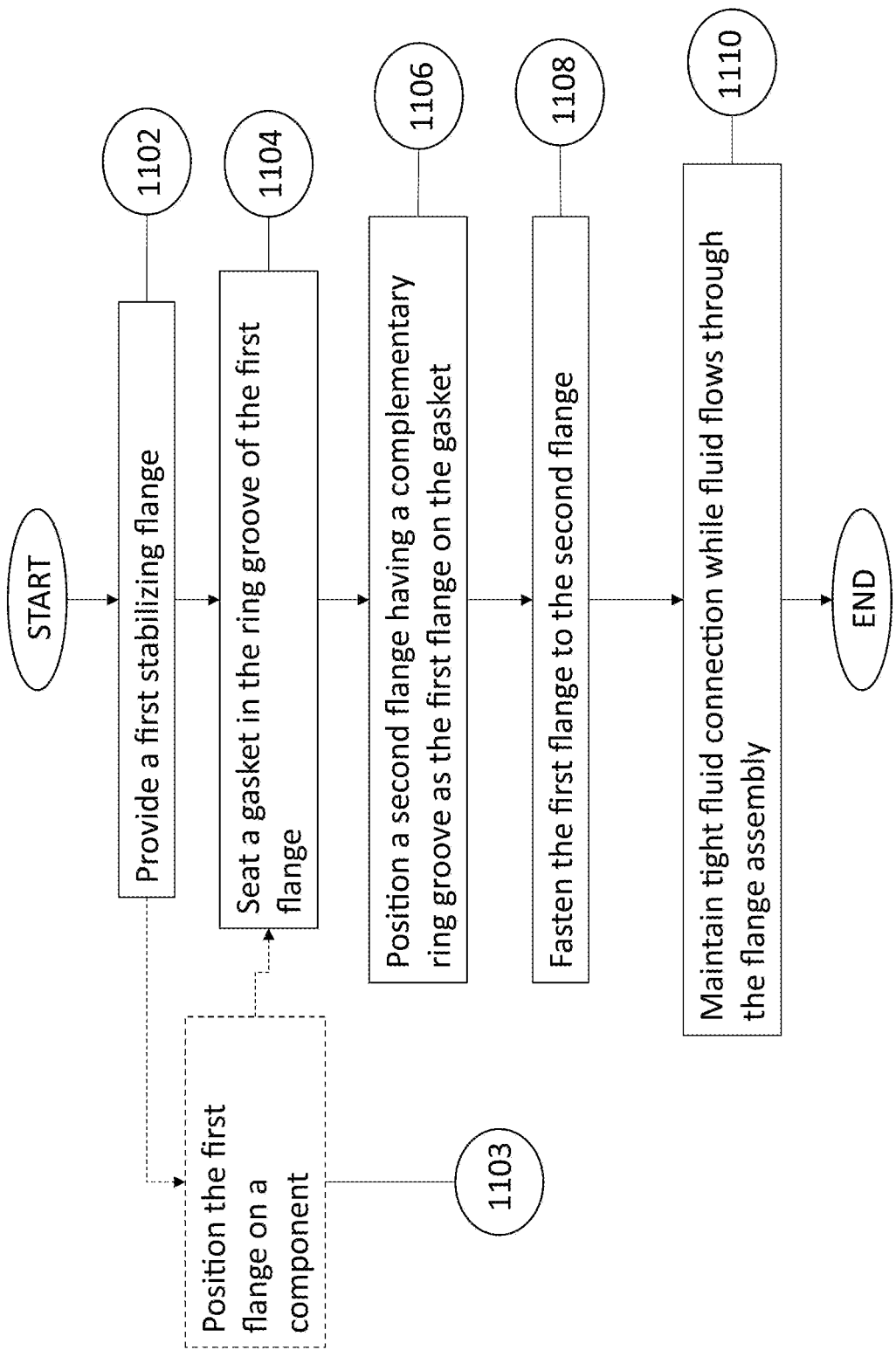
FIG. 11 describes an exemplary method for connecting an exemplary flange assembly, according to one embodiment of the present disclosure.

Now turning to FIG. 11, an exemplary method of connecting a flange assembly is described, according to one embodiment of the present disclosure. In various embodiments, the disclosed method can be utilized to connect any of flange assembly 700, 800, or 900. For the purposes of the description, flange 300 and assembly 800 are used to describe the method disclosed herein, though the disclosed method applies to each assembly 700, 800, and 900.

In multiple embodiments, at step 1102, a first stabilizing flange 300 is provided (though a blind flange 400 or weld neck flange 500, or other flanges as described herein, may also be selected).

At step 1103, in an optional embodiment, the first flange 300 may be positioned on an inlet or outlet of a component of a molten salt reactor system, such as a sump tank, such that the first flange 300 is arranged to carry a molten fuel salt through the fluid opening 306 of the flange 300. In this optional embodiment, the flange 300 may be arranged to carry the molten fuel salt in a general vertical direction or in a general horizontal direction.

At step 1104, in one or more embodiments, a gasket (such as gasket 600) is seated in the ring groove 310 of the first flange 300. In at least one embodiment, the gasket 600 may be positioned with the ring groove 310 of the flange 300 such that connection points 804 and the groove gap 806 are created.

At step 1106, in many embodiments, the flange 300 is connected to the mating surface 310 of a second flange 300 (though it could be connected to a flange 400 or weld neck flange 500) by positioning the ring groove 310 of the second flange 300 onto the portion of the gasket 600 that is not within the ring groove 310 of the first flange 300, such that the mating surface 308 of the first flange 300 and the mating surface 308 of the second flange 300 are in contact. Since the ring grooves 310 divide the mating surfaces 308 of each of the first and second flanges 300 into two portions, each portion of the mating surfaces 308 of the first flange 300 are in contact with the opposing portions of the mating surface 308 of the second flange 300. In certain embodiments, once the gasket 600 is seated within each ring groove 310 of the first and second flanges 300, and the mating surfaces 308 of each of the first and second flanges 300 are in contact with each other, the assembly 800 is connected.

At step 1108, in several embodiments, the assembly 800 may be further connected by fastening the first and second flanges 300 together by placing fasteners through the fastener openings 314 of each of the first and second flanges 300. In at least one embodiment, the fasteners may be a bolt and nut combination, such that the bolts are placed through the fastener openings 314 of each of the first and second flanges 300 and then at least one nut is connected to each bolt.

At step 1110, in at least one embodiment, the assembly 800 maintains a fluid tight connection while a fluid flows through the flange assembly 800 (or is in contact with the flange assembly, such as flange assembly 700 that does not allow fluid to flow through due to the blind flange 400 not having a fluid opening). In many embodiments, the fluid may be at a temperature at or exceeding 700° C.

In various embodiments, the flanges to be connected may not have ring grooves machined into the mating surfaces prior to the start of the disclosed method. In that case, in many embodiments, once the flanges (e.g., a first flange 300 and a second flange 300, though flange 400 and flange 500 may also be utilized) are provided, the gasket 600 having a particular thickness and hardness is selected. In many embodiments, once the gasket 600 is selected, parameters for the ring grooves 310 for the first and second flanges 300 are determined, based on at least in part the thickness and hardness of the gasket 600. In several embodiments, the parameters of the stabilizing face (e.g., the mating surfaces 308) of the first and second flanges 300 may be determined based on at least in part the thickness and hardness of the gasket 600. In at least one embodiment, the ring grooves 310 are machined into the mating surfaces 308 of each of the first and second flanges 300, based on the determined parameters. In certain embodiments, the stabilizing face is machined into each of the first and second flanges 300, based on the determined parameters. Once the stabilizing faces and the ring grooves 310 are machined, the disclosed method can continue at step 1104 (or optional step 1103). In various embodiments, machining the ring grooves and stabilizing faces based on the hardness and thickness of the gasket ensures that the mating surfaces of each flange will be in contact with each other while the gasket is optimally seated within the ring grooves, forming a fluid-tight connection.

Aspects, features, and benefits of the systems, methods, processes, formulations, apparatuses, and products discussed herein will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A stabilizing flange assembly comprising
a first flange formed from a flange body having a first side and a second side opposite the first side, the flange body defining:
    a fluid opening extending between the first side and the second side,
    a flange mating surface extending circumferentially about the fluid opening,
    a ring groove machined into the flange body at the first mating surface and extending circumferentially about, and radially offset from, the fluid opening, wherein the ring groove divides the flange mating surface between a first inner flange mating surface and a second outer flange mating surface, wherein the first inner flange mating surface has a first width and the second outer flange mating surface has a second width, and wherein the first width of the first inner flange mating surface is at least twice as large as the second width of the second outer flange mating surface;
        wherein the ring groove includes two opposing graduated sides, each including a first angled portion and a second angled portion relative to the flange mating surface;
        wherein the first angled portion is angled into the flange body at a different angle than that of the second angled portion;
        wherein the first angled portion extends from the flange mating surface into the flange body and the second angled portion extends from the first angled portion further into the flange body;
    a flange peripheral surface extending circumferentially about, and elevationally offset from, the flange mating surface,
    wherein the elevational offset of the flange peripheral surface and the flange mating surface is of a height substantially equal to a distance that the first angled portion of the ring groove extends into the flange body, such that the flange peripheral surface is substantially level with a portion of the flange body where the second angled portion extends into the flange body; and
a plurality of fastener openings circumferentially spaced about the fluid opening and extending through the flange body at the flange peripheral surface;
a gasket seated in the ring groove of the flange;
a second flange arranged contacting the gasket and the mating surface of the first flange adjacent each side of the gasket; and
a plurality of fasteners coupling the first and second flange and compressing the first and second flange toward one another,
wherein the gasket and the mating surface of the first flange are configured to maintain a fluid tight connection between the fluid opening and the second flange during passage of a fluid having a temperature in excess of 700° C. through the fluid opening and the second flange.

2. The assembly of claim 1, wherein the second flange comprises a blind flange.

3. The assembly of claim 2, wherein
the blind flange is formed from a blind flange body defining:
a blind flange mating surface extending circumferentially about a center of the blind flange body,
a blind flange ring groove formed in the blind flange body at the blind flange mating surface and extending circumferentially about, and radially offset from, the center of the blind flange body,
a blind flange peripheral surface extending circumferentially about, and elevationally offset from, the blind flange mating surface, and
the gasket is seated in the blind flange ring groove with the mating surface of the first flange and the blind flange mating surface contacting one another.

4. The assembly of claim 3, wherein the mating surface of the first flange and the blind flange mating surface contact one another adjacent both an inner surface of the gasket and an outer surface of the gasket.

5. The assembly of claim 4, wherein
the blind flange peripheral surface and the peripheral surface of the first flange establish a gap therebetween, and
the gasket and the mating surface of the first flange cooperate to define the fluid tight connection between the fluid opening and the second flange while maintaining the gap.

6. The assembly of claim 3, wherein the blind flange ring groove and the ring groove of the first flange define opposing trapezoidal region encompassing the gasket.

7. The assembly of claim 1, wherein the ring groove for the first flange comprises a base surface arranged parallel to, and elevationally offset from, the flange mating surface, and
a pair of symmetrically tapered groove surfaces extending angularly relative to the flange mating surface and the base surface.

8. The assembly of claim 7, wherein the gasket and the mating surface of the first flange cooperate to define a fluid tight connection between the fluid opening of the first flange and the second flange with the gasket remaining offset from the base surface.

9. The assembly of claim 1, wherein the second flange is another first flange such that first and second flanges define a pair of flanges.

10. The assembly of claim 9, wherein
the flange body defines a weld neck flange, a socket weld flange, a lap joint flange, a blind flange, or a slip on flange,
the first inner flange mating surface of the first flange and the first inner flange mating surface of the second flange define an inner mating surface contact annulus having a first annulus width,
the second outer flange mating surface of the first flange and the second outer flange mating surface of the second flange define an outer mating surface contact annulus having a second annulus width, and
the first annulus width is at least twice as large as the second annulus width.

11. The assembly of claim 10, wherein the inner mating surface contact annulus and the outer mating surface contact annulus are maintained during a compression of the gasket to establish the fluid tight connection between the fluid opening and the second flange during passage of the fluid therethrough in excess of 700° C.

12. The assembly of claim 11, wherein the inner mating surface contact annulus and the outer mating surface contact annulus are configured to establish a physical connection that impedes load transfer to the gasket from perpendicular or horizontal loading on the stabilizing flange assembly.

13. The assembly of claim 12, wherein said perpendicular or horizontal loading is caused by a pump fixedly coupled to the first flange.

14. A stabilizing flange comprising
a flange body having a first side and a second side opposite the first side, the flange body defining:
a fluid opening extending between the first side and the second side,
a flange mating surface extending circumferentially about the fluid opening,
a ring groove machined into the flange body at the first mating surface and extending circumferentially about, and radially offset from, the fluid opening, wherein the flange mating surface is elevationally level along each of an inner portion of the ring groove and an outer portion of the ring groove, wherein the ring groove divides the flange mating surface between a first inner flange mating surface and a second outer flange mating surface, wherein the first inner flange mating surface has a first width and the second outer flange mating surface has a second width, and wherein the first width of the first inner flange mating surface is at least twice as large as the second width of the second inner flange mating surface;
wherein the ring groove includes two opposing graduated sides, each including a first angled portion and a second angled portion relative to the flange mating surface;
wherein the first angled portion is angled into the flange body at a different angle than that of the second angled portion;
wherein the first angled portion extends from the flange mating surface into the flange body and the second angled portion extends from the first angled portion further into the flange body;
a flange peripheral surface extending circumferentially about, and elevationally offset from, the flange mating surface,
wherein the elevational offset of the flange peripheral surface and the flange mating surface is of a height substantially equal to a distance that the first angled portion of the ring groove extends into the flange body, such that the flange peripheral surface is level with a portion of the flange body where the second angled portion extends into the flange body; and
a plurality of fastener openings circumferentially spaced about the fluid opening and extending through the flange body at the flange peripheral surface,
wherein the ring groove is configured to receive a gasket such that the gasket and the mating surface along each of the inner portion and the outer portion of the ring groove form a physical connection with a raised face of another flange and establish a fluid tight connection therebetween during passage of a fluid having a temperature in excess of 700° C. through the fluid opening and the second flange.

15. The stabilizing flange of claim 14, wherein the ring groove is configured to receive the gasket in a manner that uniformly distributes a compressive load on the gasket that forms the fluid tight connection.

16. The stabilizing flange of claim 14, wherein the flange body consisting of a material of stainless steel, hastelloy, monel, inconel, titanium, duplex steel, nickel alloy, super duplex steel, incoloy, alloy 20, 254 SMO, copper nickel, carbon steel, alloy steel, aluminum, bronze, mild steel, or brass.

17. The stabilizing flange of claim 14, wherein the flange body defines a weld neck flange, a socket weld flange, a lap joint flange, a blind flange, or a slip on flange.

18. The stabilizing flange of claim 14, wherein the elevational offset of the flange peripheral surface and the flange mating surface is about 0.0625 inches and wherein the distance that the first angled portion of the ring groove extends into the flange body is about 0.06 inches.

19. A method of connecting a flange assembly, the method comprising:
   providing the stabilizing flange of claim 14;
   seating a gasket in the ring groove; and
   connecting the stabilizing flange to a raised face of another flange by forming a physical connection between
      the gasket and a complementary ring groove of the another flange, and
      the mating surface adjacent each of the inner portion and the outer portion of the ring groove and the raised face.

20. The method of claim 19, wherein the connecting further comprises associating the stabilizing flange with a sump tank of a molten salt loop such that the stabilizing flange is arranged to carry a molten salt generally vertically through the fluid opening.

\* \* \* \* \*